June 3, 1941.   A. SCHWEISCH   2,243,885
SUPPORTING SURFACE FOR AIRCRAFT
Filed Aug. 4, 1938   23 Sheets-Sheet 1
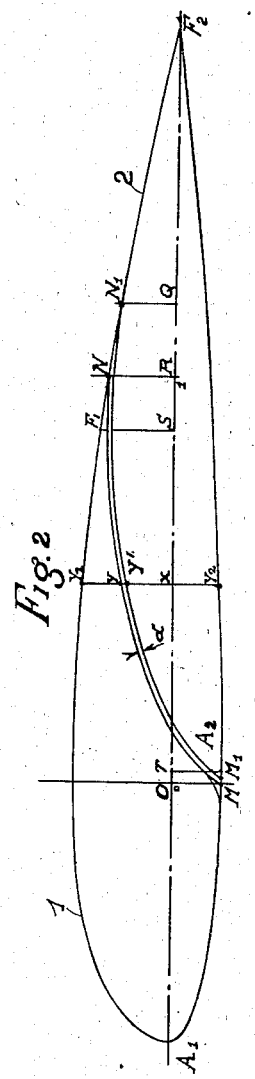
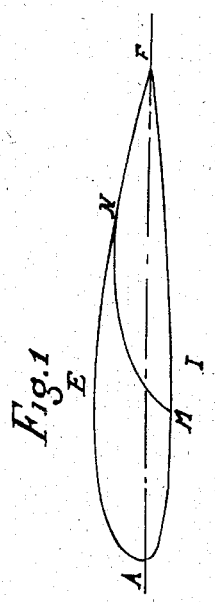
| x | OX/OR | 0 | 0.025 | 0.050 | 0.075 | 0.100 | 0.20 | 0.30 | 0.40 | 0.50 | 0.60 | 0.70 | 0.80 | 0.90 | 1.00 |
|---|---|---|---|---|---|---|---|---|---|---|---|---|---|---|---|
| y | YY₂/AY₂ | 0 | 0.147 | 0.238 | 0.304 | 0.360 | 0.530 | 0.640 | 0.727 | 0.780 | 0.824 | 0.870 | 0.912 | 0.956 | 1.00 |
| | y max | 0 | 0.260 | 0.360 | 0.440 | 0.504 | 0.652 | 0.742 | 0.806 | 0.856 | 0.894 | 0.926 | 0.952 | 0.976 | 1.00 |
| | y min. | 0 | 0.066 | 0.130 | 0.182 | 0.228 | 0.370 | 0.486 | 0.586 | 0.672 | 0.745 | 0.814 | 0.876 | 0.940 | 1.00 |
Fig. 2.2
INVENTOR
ANDRÉ SCHWEISCH
BY Bailey
ATTORNEYS

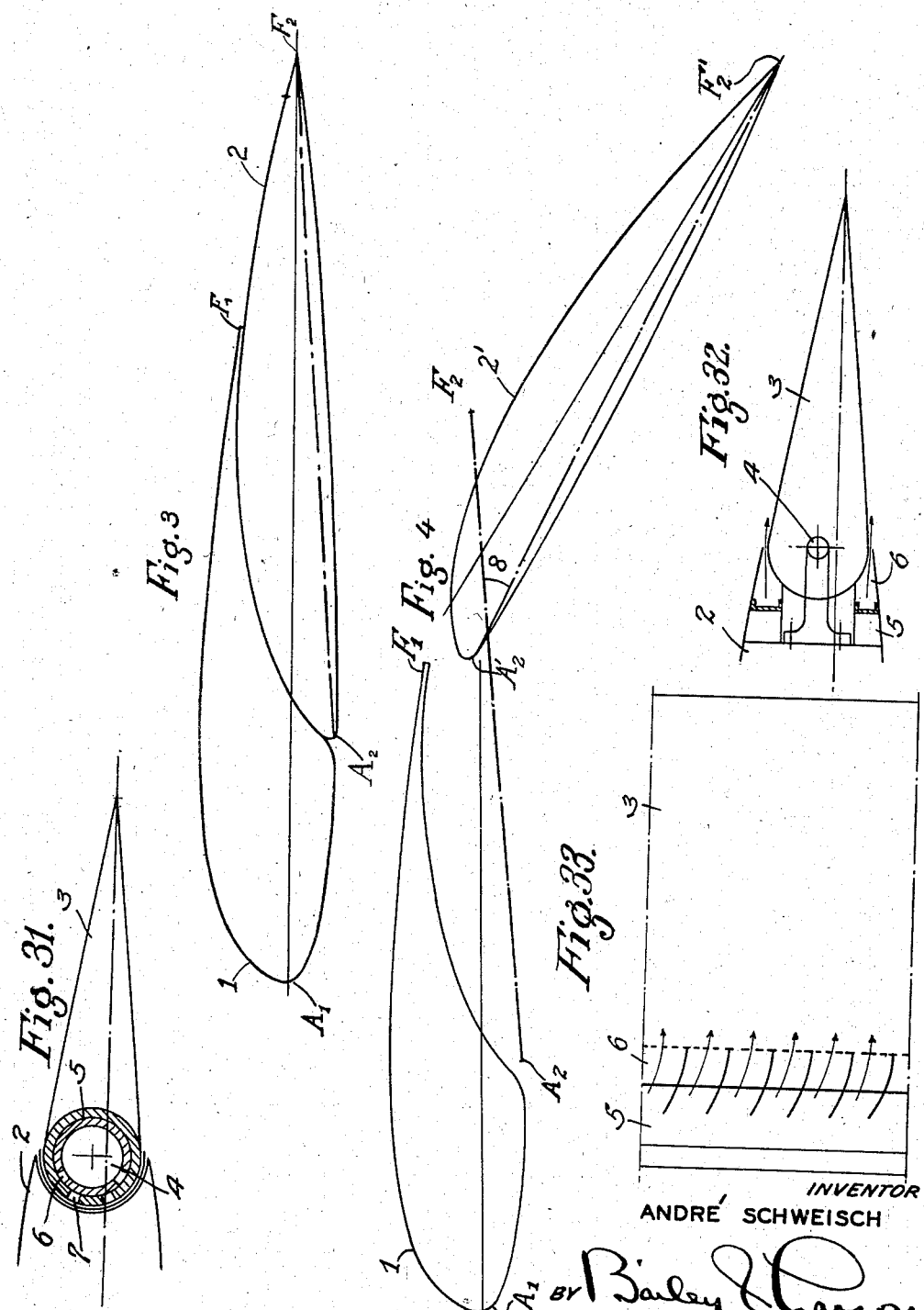

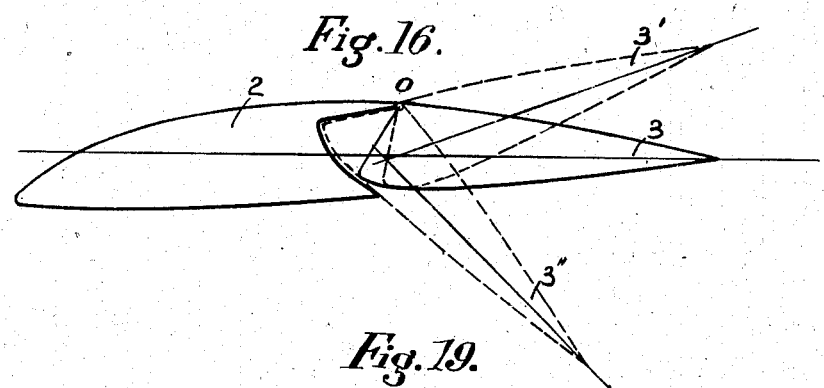
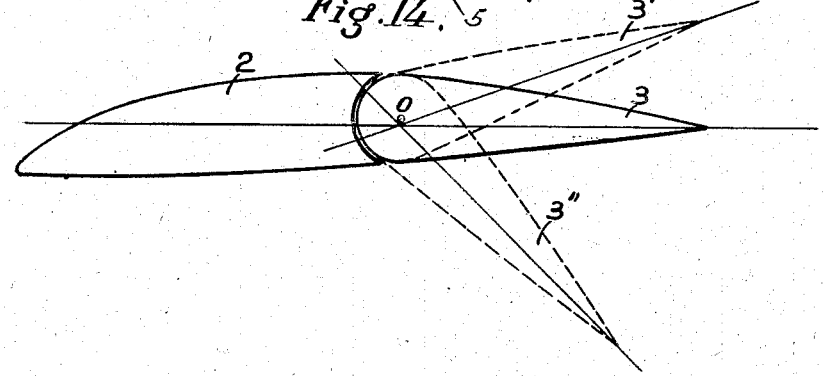
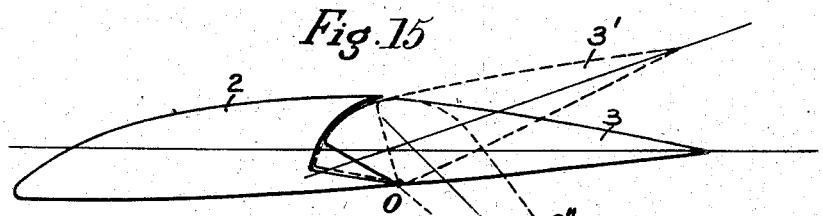
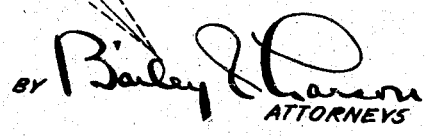

June 3, 1941.    A. SCHWEISCH    2,243,885
SUPPORTING SURFACE FOR AIRCRAFT
Filed Aug. 4, 1938    23 Sheets-Sheet 5
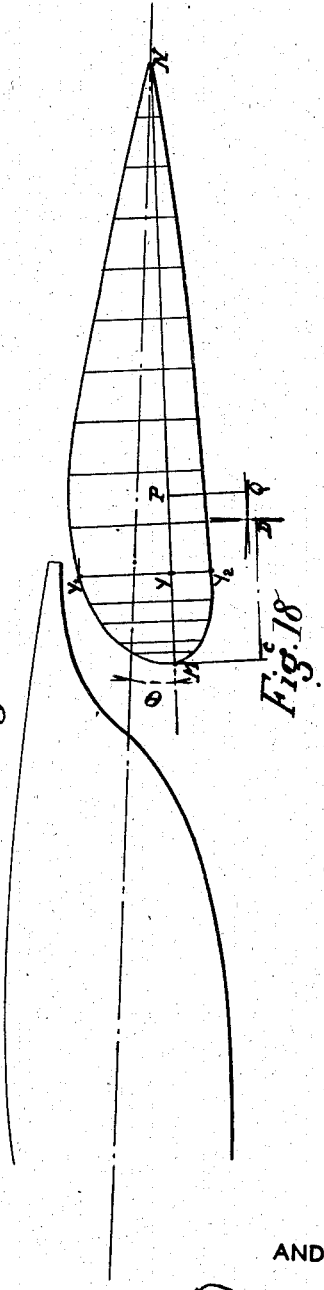
INVENTOR
ANDRÉ SCHWEISCH
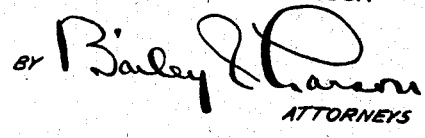
ATTORNEYS

INVENTOR
ANDRE SCHWEISCH
ATTORNEYS

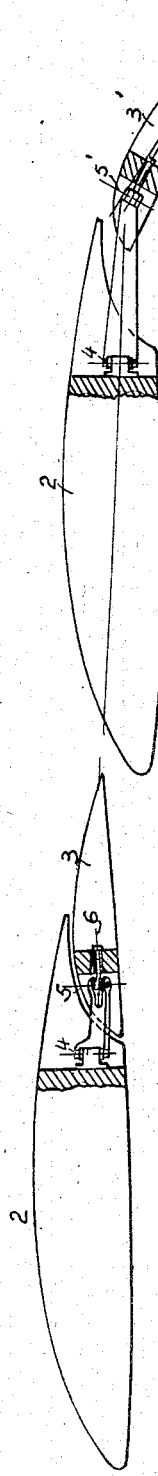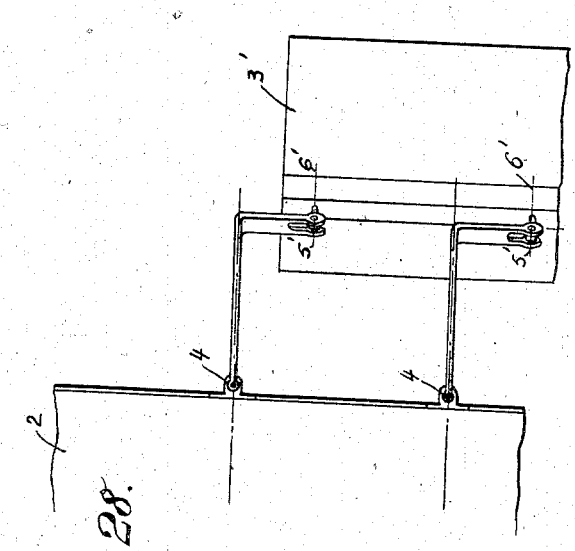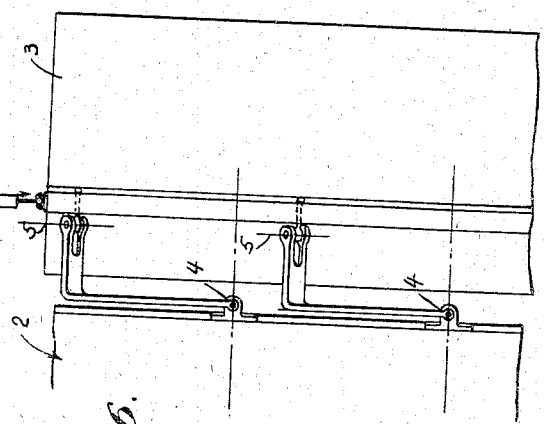

INVENTOR
ANDRÉ SCHWEISCH
ATTORNEYS

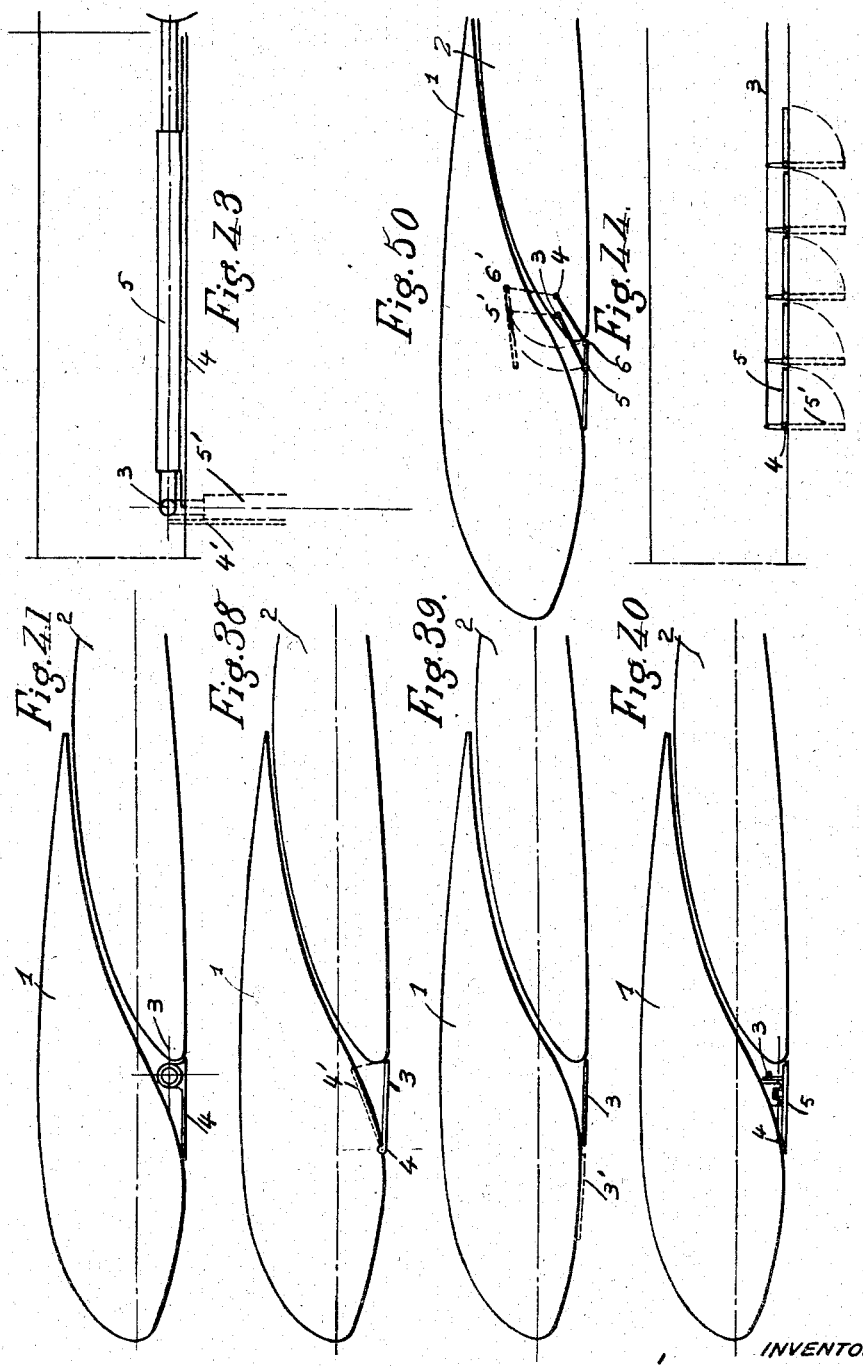

June 3, 1941.  A. SCHWEISCH  2,243,885
SUPPORTING SURFACE FOR AIRCRAFT
Filed Aug. 4, 1938  23 Sheets-Sheet 10

INVENTOR
ANDRÉ SCHWEISCH
BY
ATTORNEYS

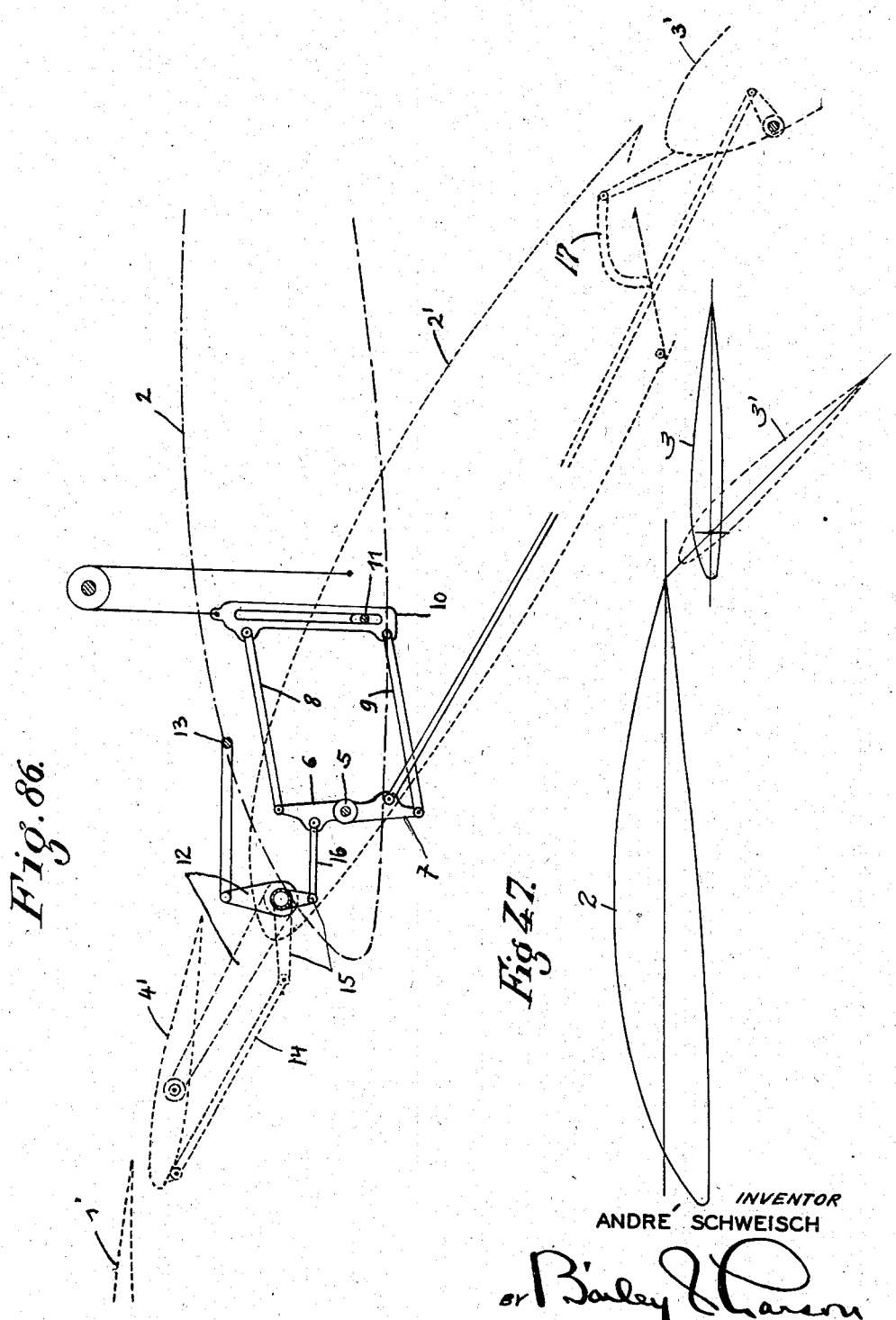

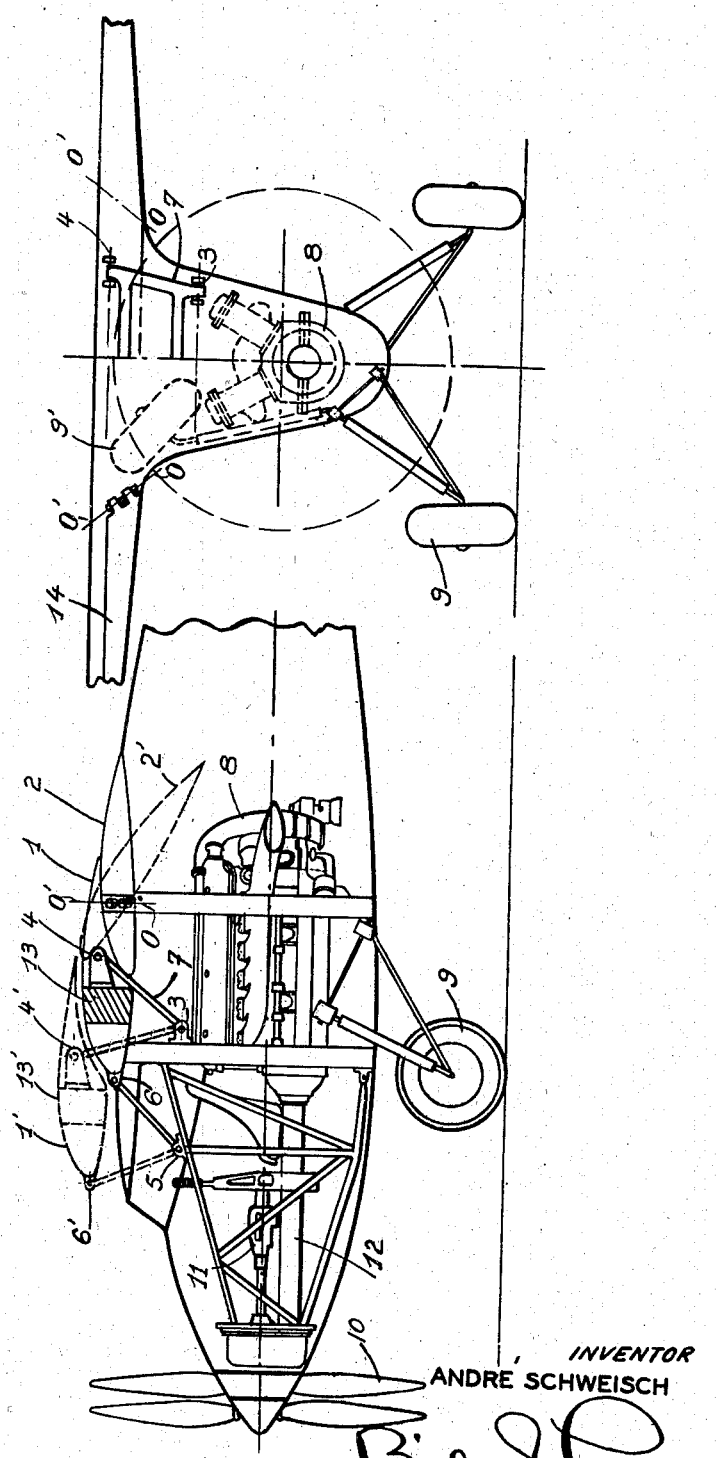

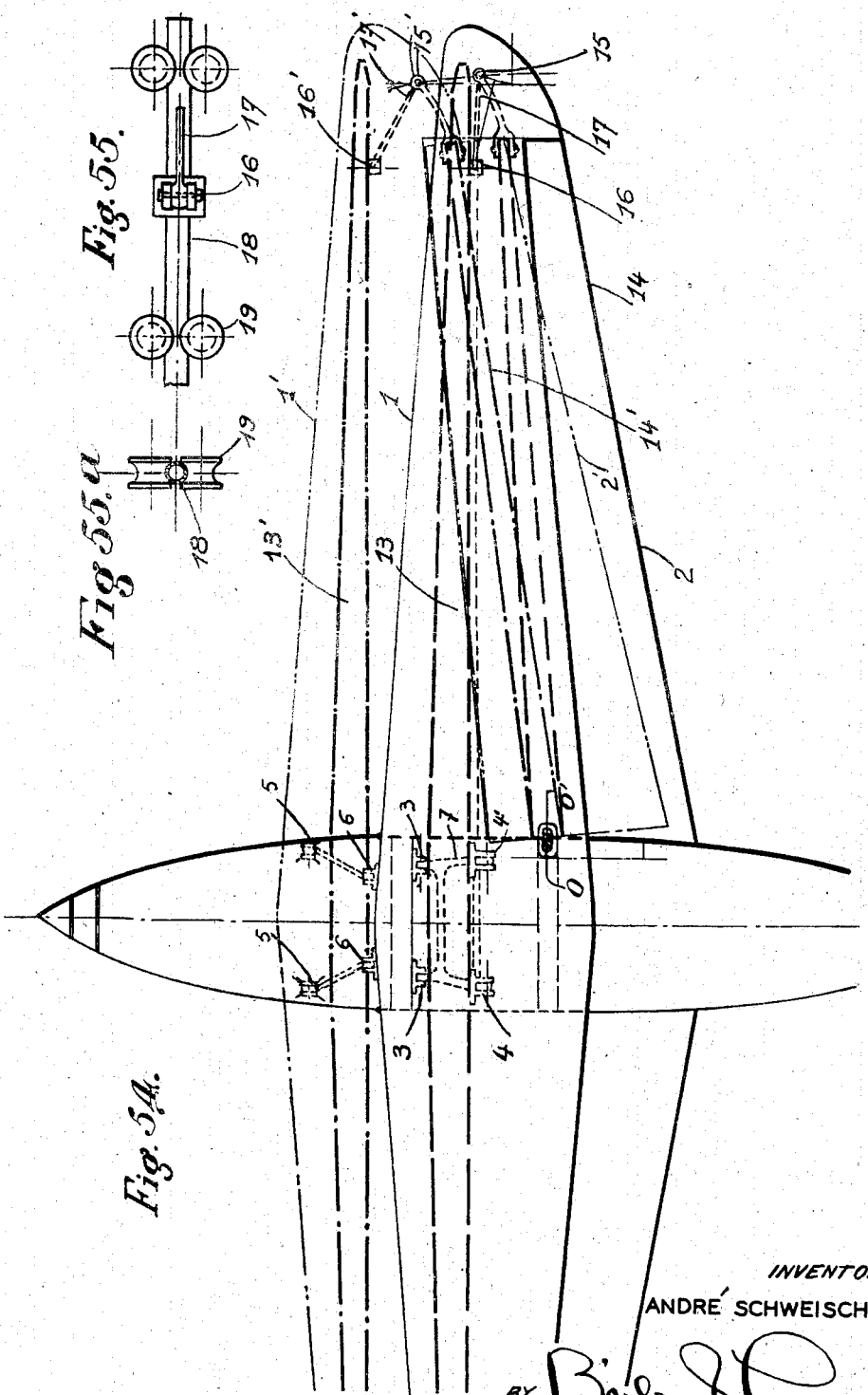

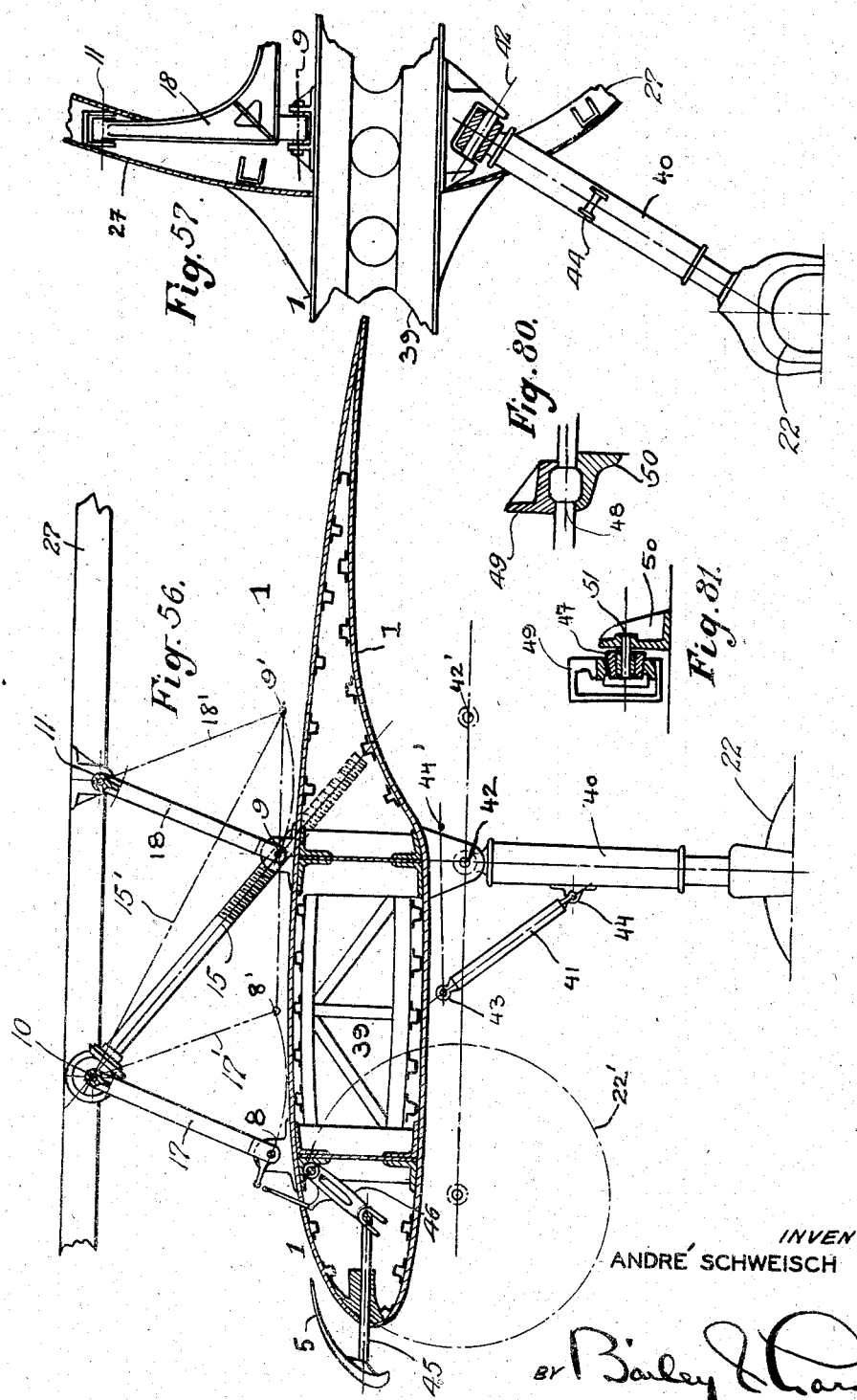

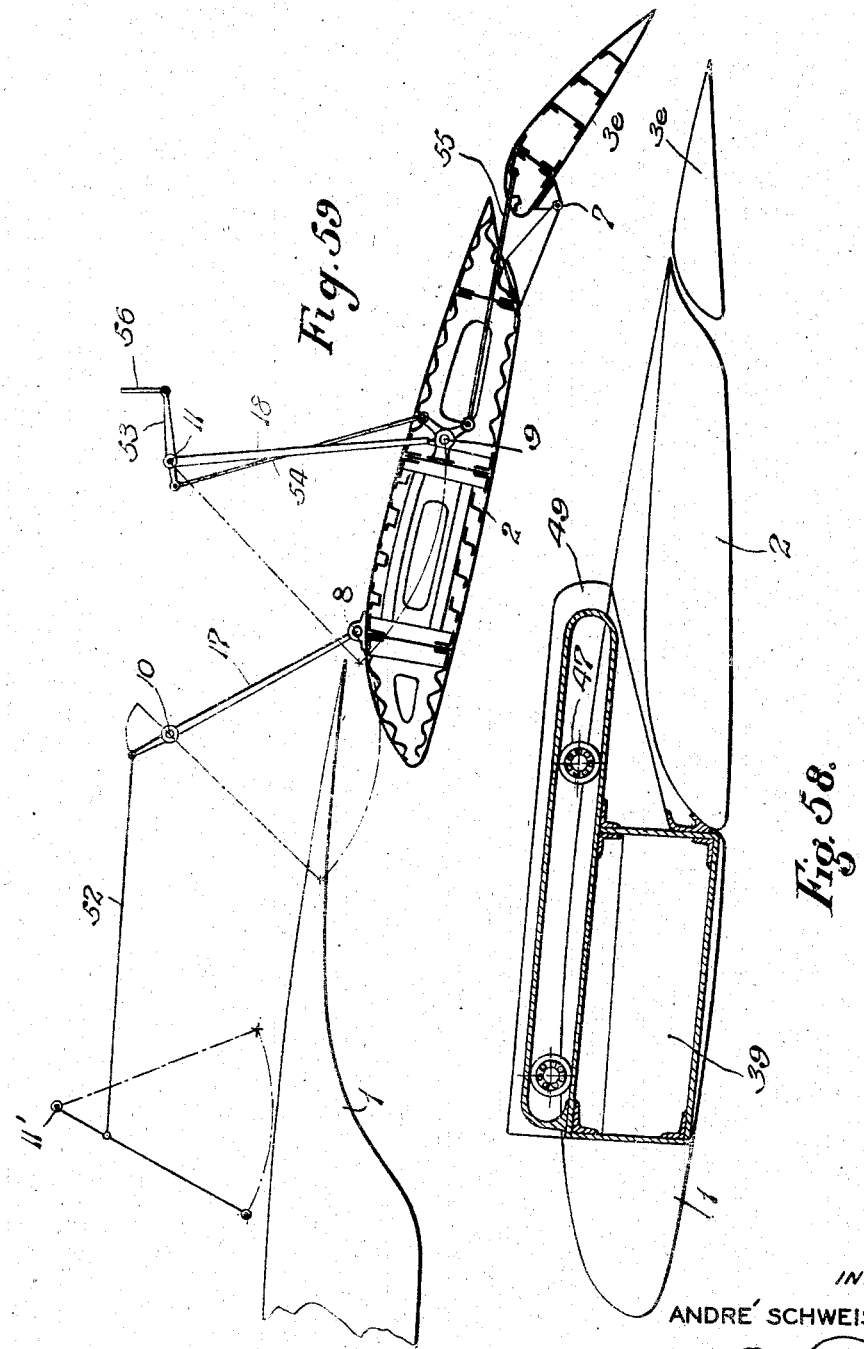

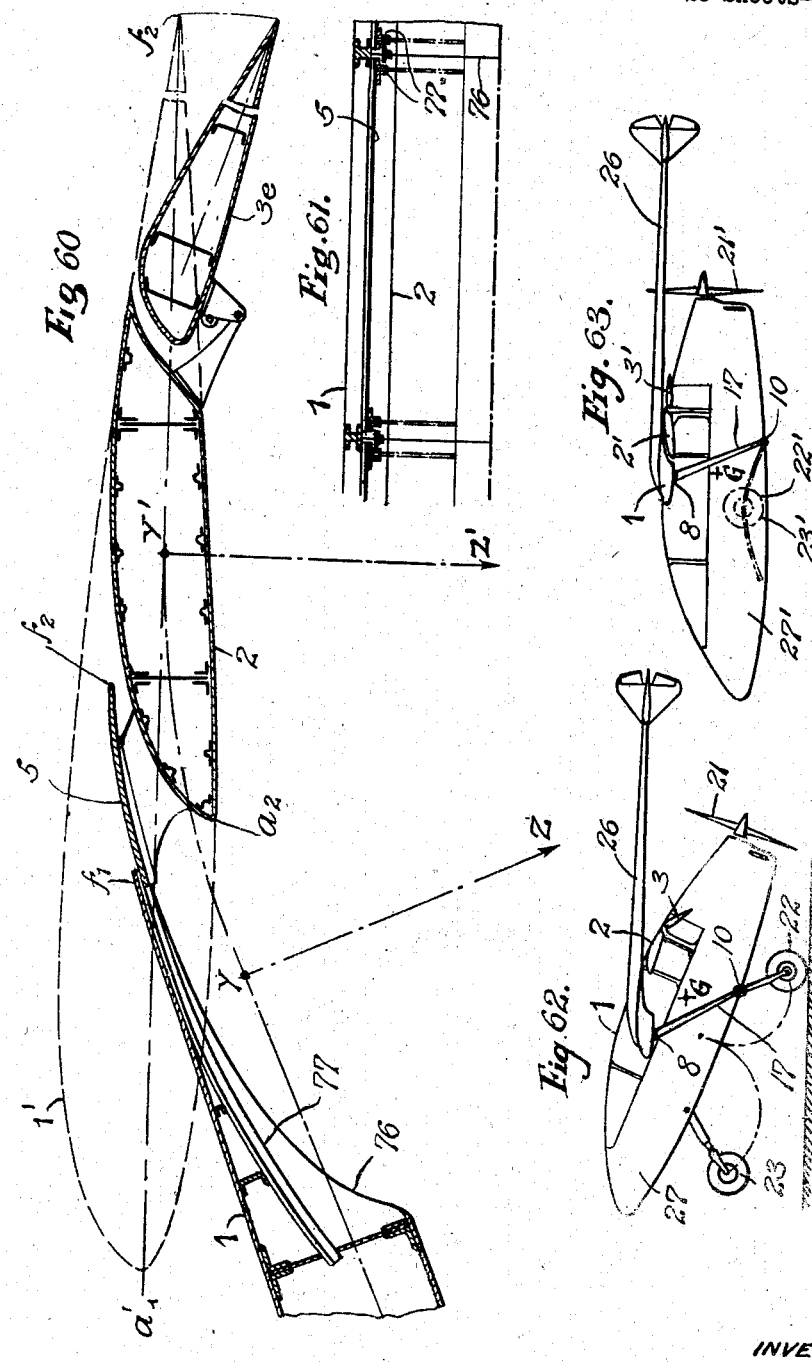

June 3, 1941.　　　　A. SCHWEISCH　　　　2,243,885
SUPPORTING SURFACE FOR AIRCRAFT
Filed Aug. 4, 1938　　　　23 Sheets-Sheet 17
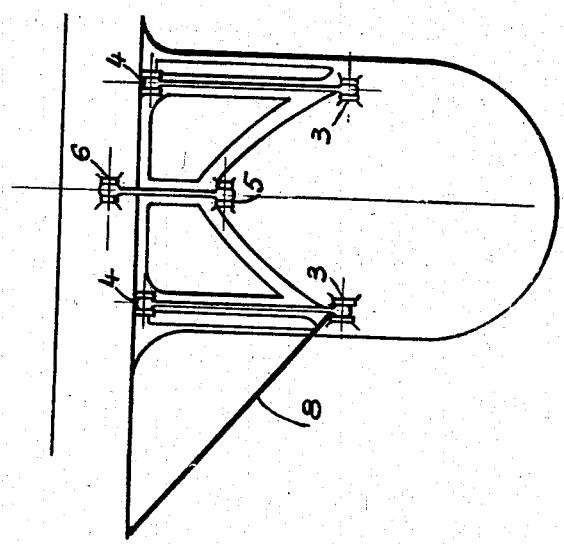
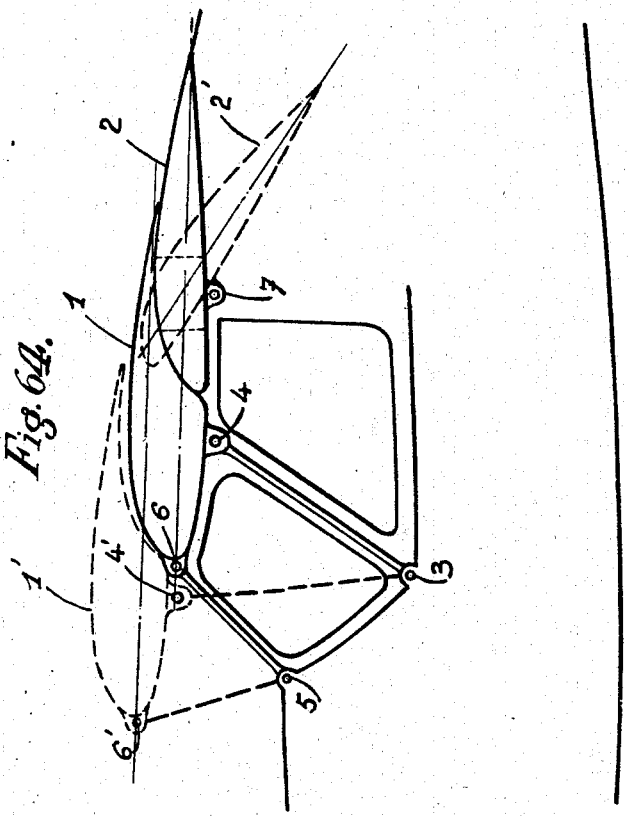
INVENTOR
ANDRÉ SCHWEISCH
BY Bailey
ATTORNEYS

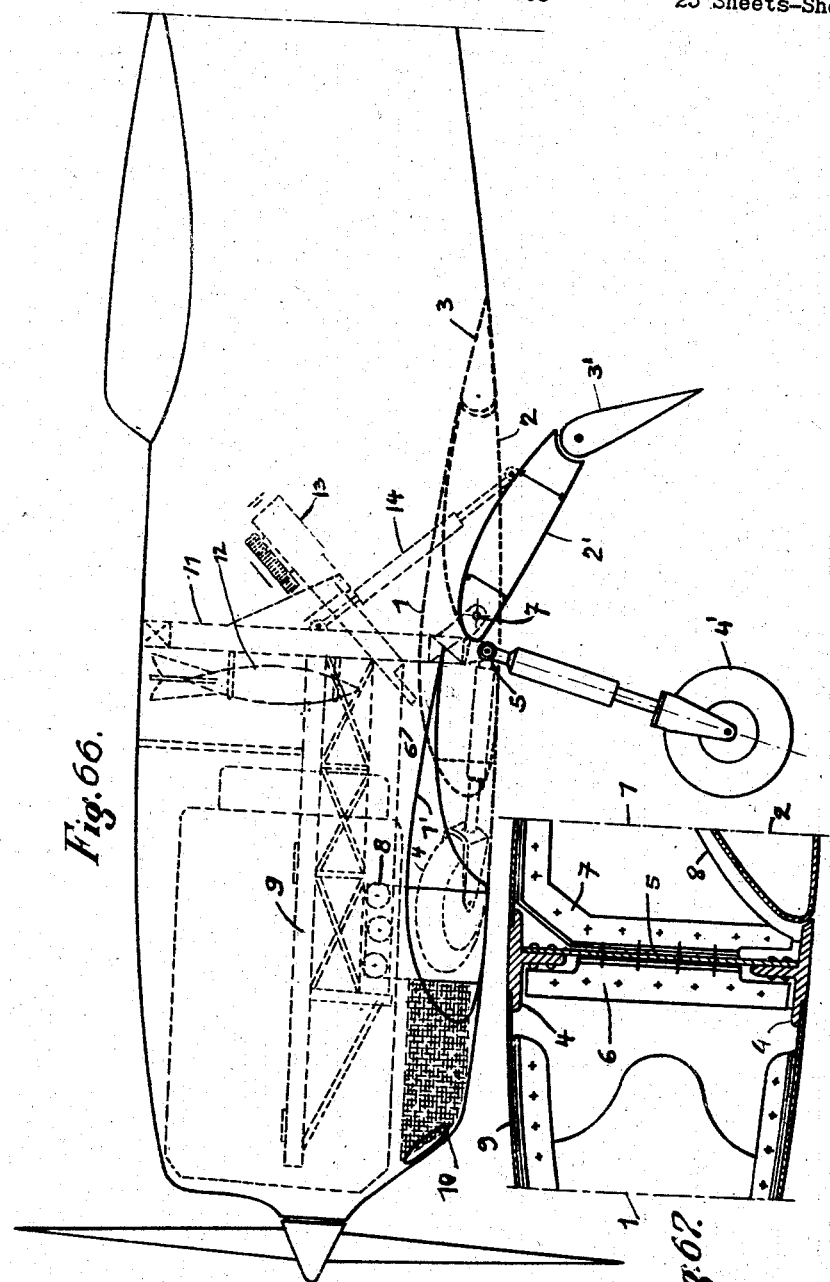

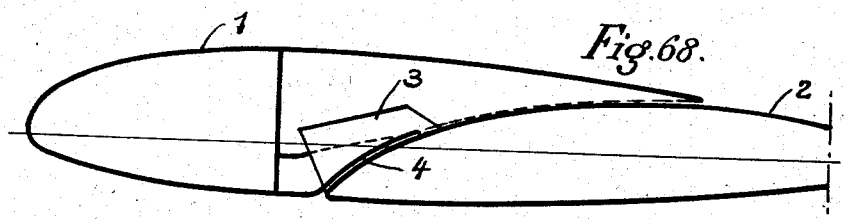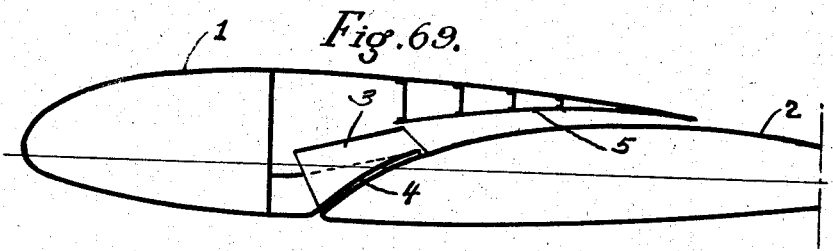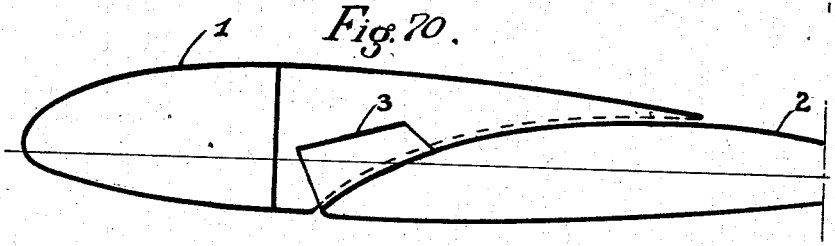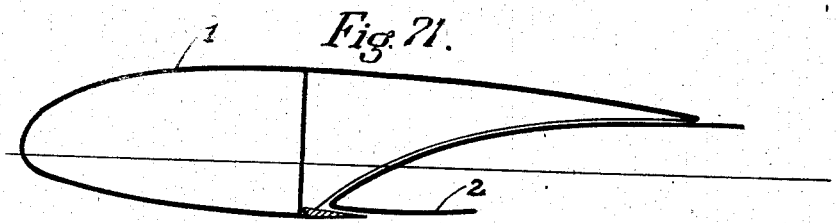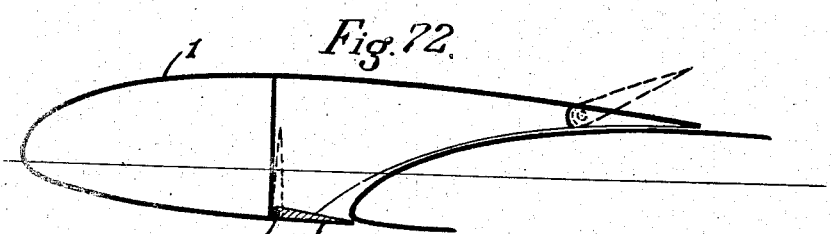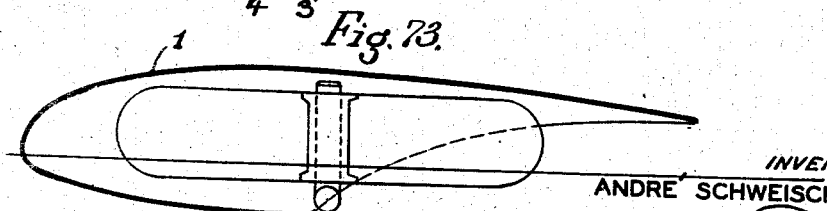

June 3, 1941.　　　A. SCHWEISCH　　　2,243,885
SUPPORTING SURFACE FOR AIRCRAFT
Filed Aug. 4, 1938　　　23 Sheets-Sheet 20

INVENTOR
ANDRÉ SCHWEISCH
BY Bailey & Carson
ATTORNEYS

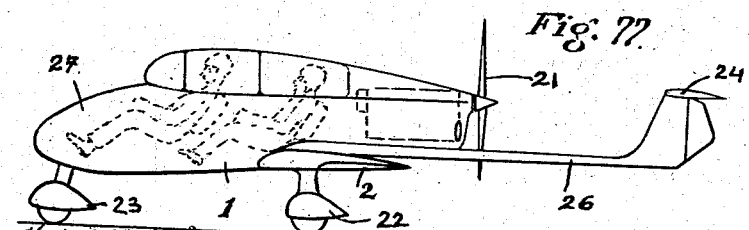
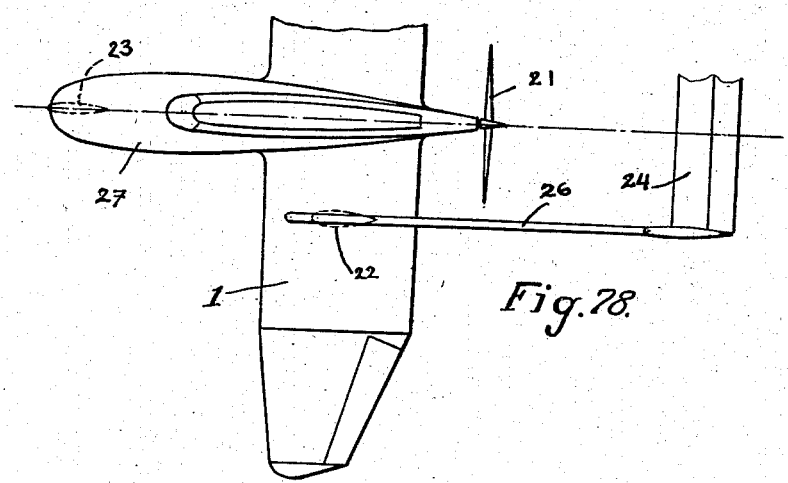
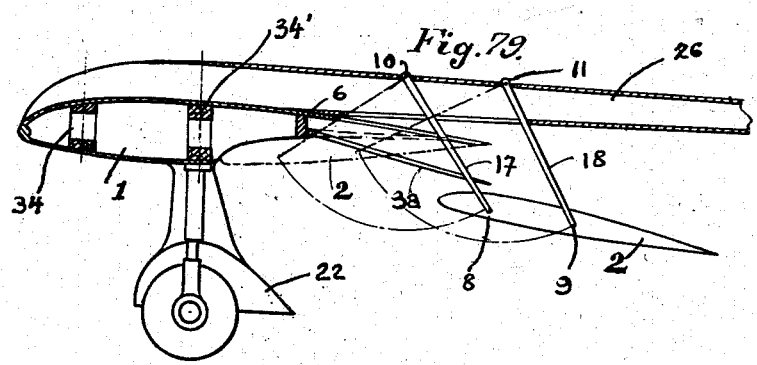

June 3, 1941.                A. SCHWEISCH                2,243,885
                   SUPPORTING SURFACE FOR AIRCRAFT
                        Filed Aug. 4, 1938          23 Sheets-Sheet 22
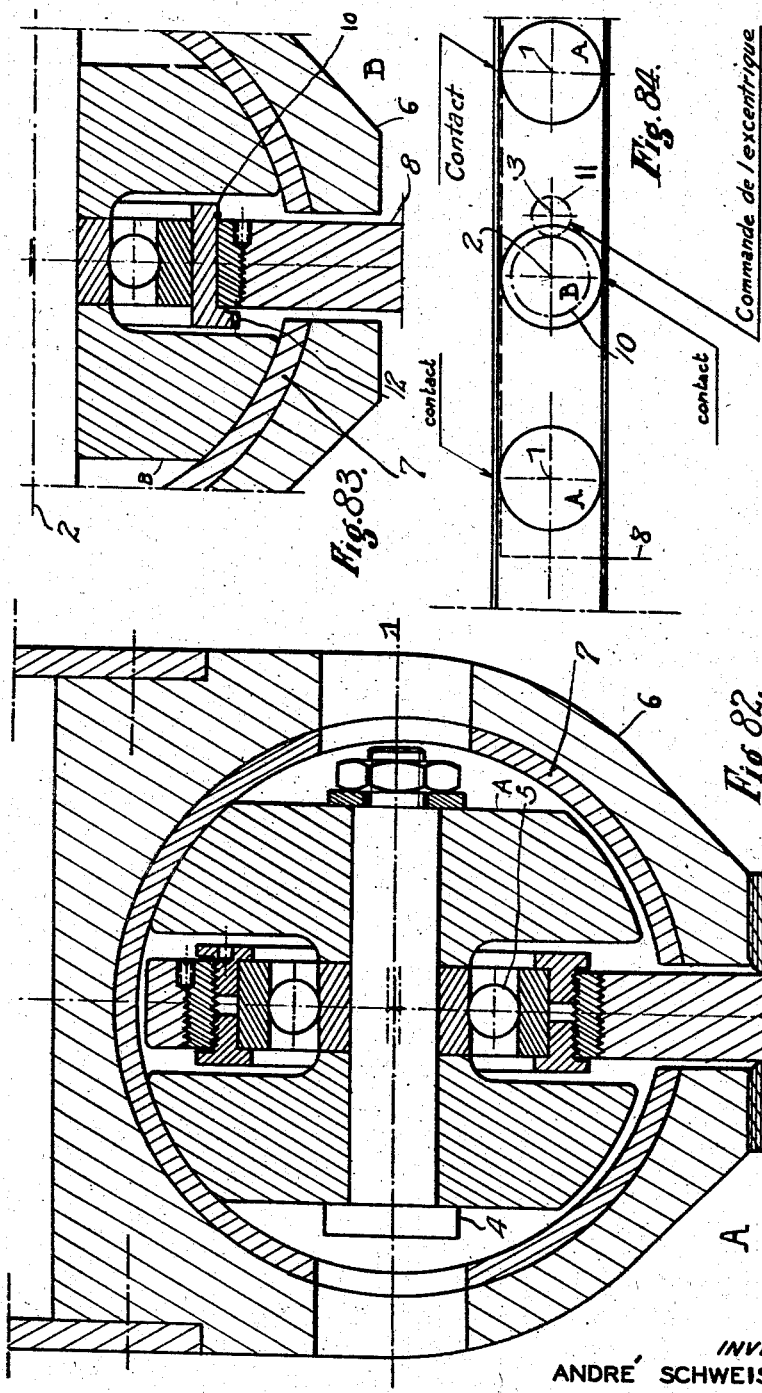
INVENTOR
ANDRÉ SCHWEISCH
BY Bailey & Larson
ATTORNEYS

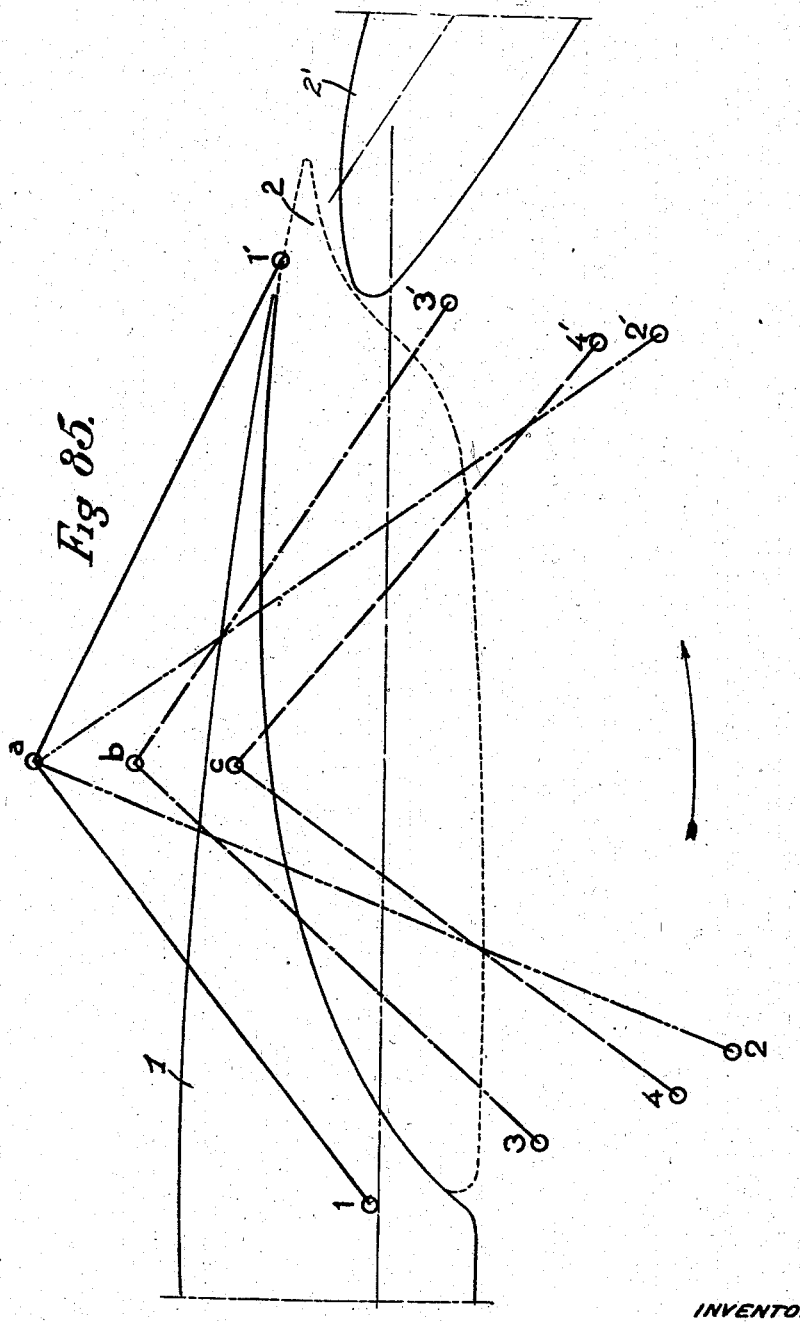

Patented June 3, 1941

2,243,885

UNITED STATES PATENT OFFICE 2,243,885

SUPPORTING SURFACE FOR AIRCRAFT

Andre Schweisch, Paris, France

Application August 4, 1938, Serial No. 223,135
In Luxemburg August 7, 1937

15 Claims. (Cl. 244—42)

The present invention relates to supporting surfaces for aircrafts of the type in which at least a portion is arranged to include a main element and at least one auxiliary element, the latter being adapted either to be applied against said main element or to be moved away therefrom so as to produce simultaneously a variation of the area of the supporting surface constituted by both of these elements and a slot effect between the adjacent edges of said elements. In the following description, this portion of the supporting surface which includes these two elements will be called "slotted portion." The invention is more especially, although not exclusively, concerned with airplane wings which are to have a high lift to drag ratio in flight and must permit of landing at low speed.

Before proceeding to explain in what my invention consists, I will give definitions of the terms to be employed in the following description, in order to avoid any misunderstanding in the explanations.

The "profile" of an element of the supporting surface is the external outline of the intersection of said element with a plane (called local plane) extending parallel to, and at a distance $z$ from, the "origin" or "reference" plane, the latter being either the vertical plane of symmetry of the airplane or a plane parallel thereto and located where the wing is joined to the fuselage (in the case of wing made of two elements located respectively on either side of said fuselage).

The "local basic profile" of the slotted portion is the outline of the system constituted by the intersections of the local plane with the two elements of the slotted portions in their normal position of flight; that is to say, when they are juxtaposed.

The basic profile will be a standard aerodynamic profile, preferably bi-convex.

The "chord" of an aerodynamic profile is defined, in position, magnitude, and direction, by the vector, of the same direction as the relative wind, the ends of which are the points of said profile that are at the maximum distance from each other.

The "trailing point" is the end of this vector.

The "leading point" is the origin of this vector.

The "underside" is the lower part of the profile contour.

The "upperside" is the upper part of the profile outline.

The "trailing edge" is the rear part of the outline (underside and upperside) adjoining the trailing point. The "leading edge" is the front part of the outline (underside and upperside) adjoining the leading point.

The "theoretical split line" of the basic profile is the line, located inside the profile contour, which extends from a point M of the underside to a point N of the upperside. It divides the profile into two portions.

The "main profile" of the slotted portion is that of the front section limited by this split line, i. e., that profile of which the leading edge coincides with the leading edge of the basic profile.

The "auxiliary profile" of the slotted portion is that of the rear section, behind this split line, i. e., that the trailing edge of which coincides with the trailing edge of the basic profile.

The "theoretical split line" of the basic profile constitutes the rear part of the underside of the main profile. The front part of the upperside of the auxiliary profile generally consists of a line, located behind the split line and at a short substantially uniform distance therefrom, so as to leave a certain constructional play between the two elements.

Fig. 1 is a profile of an aircraft sustaining surface embodying the invention in simple form;

Fig. 2 is an enlargement of Fig. 1 with reference lines and points;

Figs. 3 and 4 show a similar wing with the parts in two different positions;

Figs. 14 to 16 show on a larger scale the contour of the rear wing part with different forms of flaps thereon;

Fig. 17 shows the contour of a slotted flap with reference lines and points;

Fig. 18 is a table referring to Fig. 17;

Figs. 19 to 21 show in different positions slot-closing means for flaps of the general type shown in Fig. 17;

Figs. 25 and 27 are views partly in section of another form of slotted flap in two different positions;

Figs. 26 and 28 are top plan views of Figs. 25 and 27 respectively;

Figs. 29 and 30 are views similar to Figs. 25 and 27 of a further modification;

Figs. 31 and 32 show two forms of flap on the rear wing member with means for introducing air into the slot;

Fig. 33 is a top plan view of Fig. 32;

Figure 74:
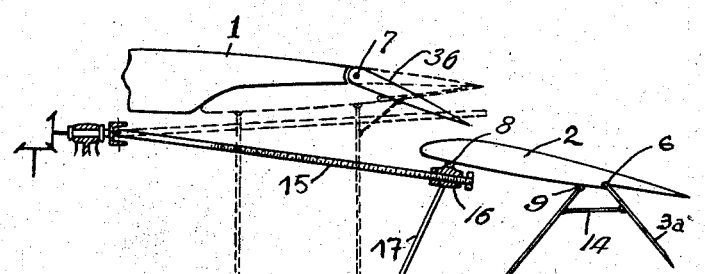
Figure 75:
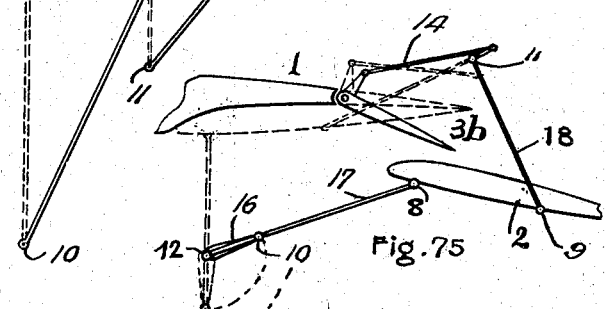
Figure 76:
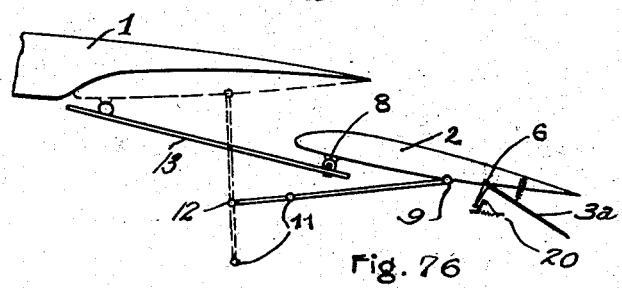

Figs. 34 to 37, and 47 show the contour of the rear wing member with other forms of flaps;

Figs. 38 to 41, 45, 46 and 48 to 51 show the contour of the front portion of a wing with still further types of flaps;

Fig. 42 is a table explanatory of Fig. 74;

Figs. 43 and 44 are top plan views of Figs. 41 and 40 respectively;

Figs. 52, 53 and 54 are a side elevation (partly in section), a front elevation and a top plan view respectively of a modified form of aircraft with wings of trapezoidal shape embodying the invention;

Fig. 55 is a detail of a part of the structure of Figs. 52 to 54;

Figs. 56 and 57 show in side and front view respectively the mounting of the forward wing member for movement;

Fig. 58 shows a modification thereof;

Fig. 59 shows the mounting of the rear wing part for movement;

Fig. 60 is a profile view of the rear end of a wing embodying the invention;

Fig. 61 is a transverse section through the slot of Fig. 60;

Figs. 62 and 63 show in two positions an aircraft provided with a wing of the type shown in Fig. 60;

Figs. 64 and 65 are a side elevation and a front view respectively of a wing according to the invention provided with means for increasing the incidence of the rear wing member;

Fig. 66 is a side elevation of the front part of an aircraft embodying a modification thereof;

Fig. 67 is a horizontal section through a portion of Fig. 66;

Figs. 68 to 73 show various forms of the front portion of a wing embodying the invention in which a part of the covering on the underside of the front wing member is omitted;

Figs. 74 to 76 show different forms of means for guiding the movable elements of the slotted portion;

Figs. 77 and 78 are a side elevation and a top plan view respectively of an aircraft provided with a wing embodying the invention;

Fig. 79 is a view showing the guiding means for the movable wing member thereof;

Figs. 80 to 83 are transverse sections through wing part guiding means;

Fig. 84 is a diagrammatic view of a roller carriage;

Fig. 85 is a diagram showing the movement of wing parts;

Fig. 86 shows a form of leverage for controlling movement of wing parts.

For the sake of clarity, the following definitions will be given with reference to Figs. 1 to 4 of the appended drawings, which show different airfoil sections, each including a main profile 1 and an auxiliary profile.

If the trailing edge of the main profile 1 is cut away (Fig. 2), its true trailing point will be $F_1$, located ahead of the rear end N of the theoretical split line MN. If the leading edge of the auxiliary profile 2 is rounded off, its true leading point will be $A_2$, different from $M_1$ (front end of line $M_1N_1$ parallel to MN) and located slightly on the inside of the basic profile.

The "local complex profile" is constituted by two elements located away from each other, as shown by Fig. 4, to wit, on the one hand the main profile 1, registering with the front portion of the basic profile, and on the other hand the auxiliary profile 2.

These two profiles are located at a distance from each other so as to create a slot effect between their adjacent edges, this position corresponding to lift increase flight. I will consider only the final position 2' of profile 2.

Considering now a "local" plane at a distance $z$ from the reference plane, and if $A_1$ and $F_1$, $A_2$ and $F_2$, $R'_2$ and $F''_2$ are, respectively, the leading and trailing points of profiles 1, 2 and 2' (Figs. 3 and 4), the following definitions are given:

The "chord" $c$ of the basic profile is $A_1F_2$.

The "relative chord" $c'$ of the complex profile is $A_1F''_2$.

The "overlap" of the basic profile, $r$, is $A_2F_1$.

The "relative overlap" of the complex profile is $r'$, equal to $A'_2F_1$.

The "chord" $c_1$ of the main profile is $A_1F_1$.

The chord $c_2$ of the auxiliary profile is $A_2F_2$.

Considering only the half of the wing located on one side of the "reference plane," the "span" $l$ of the slotted portion (limited by local planes located at distances $z_1$ and $z_2$ from the reference plane) will be $z_2-z_1$.

The "complex area" $s'$ will be $$\int_{z_1}^{z_2} c' dz$$

The "mean local plane" will be located at a distance $z_0$ from the reference plane equal to:

$$\frac{l}{s'}\int_{z_1}^{z_2} c'z\, dz$$

In every local plane, the "theoretical split line" will be defined, with respect to the local basic profile by the following conditions:

O is the projection of M on the chord $A_1F_2$ of the basic profile (Fig. 2);

R is the projection of N on the same line;

S is the projection of $F_1$.

T is the projection of $A_2$.

X is any point.

A line perpendicular to the chord at X determines three points of intersection, to wit:

$Y_1$ on the upper side of the basic profile;

Y on the split line M—N;

$Y_2$ on the underside of the basic profile.

The thickness $e$ of the basic profile will be vector $Y_1$—$Y_2$.

The thickness $e_2$ of the auxiliary profile will be vector $Y$—$Y_2$.

Supposing that $x$ is equal to $$\frac{OX}{OR}$$

and that $y$ is equal to $$\frac{e_2}{e}$$

Fig. 2, the "diagram" of theoretical splitting will be the law $$y=f(x)$$

between O and R;

The "projected theoretical auxiliary chord" will be $v=OF_2$;

The "projected theoretical overlap" $w$ will be TS;

The "projected practical overlap" $w_1$ will be T S;

The "projected relative overlap" $w'_1$ will be the projection of $A'_2$ on the basic chord;

The maximum thickness of the basic profile will be $e$ maximum;

The thickness of the auxiliary profile will be $e_2$ maximum;

The "relative curvature of the complex profile" is the angle $\theta$ of the two vectors $A_2F_2$ and $A'_2F''_2$;

The "auxiliary radius" is the minimum radius of curvature of the joining line $M_1Y'N_1$ with the line $M_1Y_2F_2$;

The above definitions concern the constitution of the two profiles of the slotted portion. It is now necessary to define what is called by the word "flap." In the present specification, a "flap" is an element of secondary nature carried by a profile in such manner that its presence or its change of position creates a substantial variation of the aerodynamic flow of air along said profile without substantially changing the relative chord of the whole of the profile and the flap. The secondary flap differs from a wing by the fact that its profile is of dimensions smaller than those of the profile with which it is associated (the chord of these flaps never exceeds 40% of that of the profile on which it is fitted).

In a general manner, the secondary flaps are classified into two groups:
1. The internal flaps;
2. The external flaps.

I will call "internal flap" any flap such that in normal position of flight, its profile is located on the inside or on the inner limit of the contour of the profile on which is is placed. I will call "external flap" any flap such that, in normal position of flight, its profile is located on the outside of the contour of the profile on which it is fitted.

According to their position on the profile, the flaps are classified into four groups:

(a) trailing edge flaps;
(b) leading edge flaps;
(c) underside flaps; and
(d) upperside flaps.

The trailing edge flap is obtained by making movable the whole of the rear part of the trailing edge. I obtain in this way flaps of the so-called "curvature type."

The leading edge flap is obtained by making movable the front part of the leading edge. I obtain in this way flaps of the so-called "Handley-Page" or "Maxwell" type.

Underside and upperside flaps are concerned only with the underside or the upperside of the wing and as a rule they are of substantially rectilinear profile.

The above definitions can be applied to the whole of a profile and a flap, especially in the case of an auxiliary profile.

The "relative curvature of the auxiliary profile" is the angle $\theta$ of rotation of the secondary flap with respect to said profile.

The chord of the flap is $c_3$.

The "auxiliary relative chord" is the magnitude $c'_2$ of the vector extending from the leading edge of the auxiliary profile to the trailing edge of the secondary flap.

The object of the present invention is to provide devices of the type above described which are better adapted to meet the requirements of practice than the devices of the same kind used for the same purposes up to the present time.

An essential feature of the present invention consists in providing at least one of the elements which constitute the slotted portion of the airfoils of the type considered with secondary flaps (for instance of the lift increase type) capable of modifying the aerodynamic characteristic of this element.

According to another feature of the present invention, which relates more especially to biplane systems the upper wing of which is located ahead of the lower wing, the upper is made in such manner that it includes, at least over a certain length, at least one "slotted portion," arranged in such manner that, when the auxiliary element of this slotted portion is moved away from its main element, the trailing edge of said auxiliary element produces, together with the leading edge of the lower wing, a slot effect capable of increasing the lift coefficient of said lower wing.

Another feature of the present invention, consists in making the slotted portion of the airfoils that are considered in such manner that its auxiliary element, which supports aerodynamic reactions, is sufficiently strong for being maintained only by the fuselage or by a very small number of points on the main element. This arrangement eventually permits of utilizing the resistance of the auxiliary element for supporting the rear part of the main element, which can thus be made of reduced thickness so as to increase the space available for the housing of the auxiliary element, the relative size of which can thus be rather important.

A fourth feature of the present invention consists in arranging in such manner the slotted portion of the airfoils that the main element can be moved forward with respect to the body of the aircraft, this forward movement being advantageously determined in such manner as to produce no variation in the position of the thrust center of the whole of the supporting airfoil with respect to the body of the aircraft.

Besides, the invention contemplates the use of means for increasing the incidence of the auxiliary element with a view to avoiding an exaggerated upward inclination of the aircraft when flying with the lift increase means in service.

Another feature of the present invention consists in arranging in such manner the slotted portion of the wing or airfoil that the chords of the main element and of the auxiliary element of said slotted portion both range from 60 to 80% of the chord of the basic profile, the whole being such that, in expanded position, the leading edge of the auxiliary element comes substantially in the vertical plane of the trailing edge of the main element.

A sixth feature of the present invention relates to the case of a trapezoidal wing in which the relative displacement of the two elements of the slotted portion results from a translatory movement. It consists in negatively fixing the basic profiles located near the tips of the wing with respect to the basic profiles of the central portion fixed to the fuselage, this in order to improve the slot effect according to the span of the wing.

A seventh feature of my invention is also more especially concerned with trapezoidal or similar wings and it consists in arranging the means for controlling the movable element of the slotted portion of the wing in such manner that, over the whole length of this slotted portion, the leading edge of the auxiliary element comes substantially on the vertical line of the trailing edge of the main element.

Still another feature of the invention consists in constituting at least a part of the main element of the slotted portion by a leading edge only the upper side of which is prolonged as far as the trailing edge of said element (the under side being omitted either wholly or partly as far as the trailing edge).

Still another feature of the invention consists in arranging the housing provided in the fuselage for the displacement of the movable element of the slotted portion in such manner that it permits of either throwing objects (fuel tank, bomb, etc.) or sighting the ground, or displacing an element of a retractable landing gear, or again of firing shots, all these operations being advantageously performed when the flying speed is low, that is to say when said orifice is open.

According to still another feature of the present invention, which permits of obtaining maximum values of the lift coefficient, approximating 4 in flight with the lift increase means in action, with a small drag in normal flight, I make use of basic profiles of high lift/drag ratio, preferably of symmetrical or disymmetrictl biconvex section (such for instance as aerofoils of family 23,000 of NACA) the maximum thickness of which is for instance from 14 to 18% of the chord, and I choose the characteristics of the profiles of the slotted portion in such manner that they comply with the following conditions:

$$0.13 \leq \frac{e \max}{c} \leq 0.18$$

$$0.28 \leq \frac{\omega_1}{c} \leq 0.60$$

$$1.1 \leq \frac{c'}{c} \leq 1.5$$

$$0.1 \leq \frac{r'}{e \max} \leq 1$$

$$0.5 \leq \frac{c_2}{c} \leq 0.85$$

$$0 \leq \frac{a_1}{e \max} \leq 1.2$$

$$-1 \leq \frac{\omega'_1}{e \max} \leq 1$$

$$10° \leq \theta \leq 45°$$

$$0.5 \leq \frac{c_1}{c} \leq 0.85$$

Besides, the theoretical split diagram can be represented by a curve the coordinates of which are defined by a table which will be referred to when describing the succeeding figures (Fig. 5, etc.) which gives, as a function of $x$, the maximum and minimum limits of $y$.

It gives also, by way of indication, the values of $y$ which seem the most advantageous.

Besides, the corresponding relative proportions which I find to be the most advantageous are given, in the means local plane, by:

$\frac{e \max}{c}$ equal to 0.15

$\frac{\omega_1}{c}$ equal to 0.45

$\frac{c'}{c}$ equal to 1.40

$\frac{r'}{e \max}$ equal to 0.38

$\frac{c_2}{c}$ equal to 0.75

$\frac{a_1}{e \max}$ equal to 0

$\frac{\omega_1}{e \max}$ equal to 0

$\frac{c_1}{c}$ equal to 0.70

Finally, concerning angle $\theta$ (which defines the relative angular position of the two slotted elements) the best value thereof may be:

Either close to 35° if it is desired to obtain high values of $Cz$;

Or, on the contrary, close to 15° if it is desired to obtain reduced values of $Cx$ while keeping values of $Cz$ which are important although lower than in the preceding case.

I may also provide means for controlling the auxiliary element such that they permit of fixing said element in either of these two positions according to the desired aerodynamic conditions to be obtained.

However these values may undergo some modifications according to the specific conditions (these variations being as much as 10% for instance).

Preferably the slotted portion will extend over the whole span of the wing.

According to still another feature of my invention, I make use of secondary flaps, preferably of the known type called "slotted curvature flap," the chord of which is about 30% of that of the basic profile and the slot of which can be closed under normal flying conditions, it being well understood that rotation of the flap (through about 30 or 40°) in the downward direction does not substantially increase the relative chord of the profile (as a rule it decreases it) but very substantially modifies the curvature of the profile on which it is fitted.

In the case of curvature flaps mounted on the auxiliary profile, said flaps can, under normal, or lift increase, conditions of flight, act as ailerons. When flying under lift increase conditions, the same effect can also be obtained by the operation of flaps mounted, either on the trailing edge of the main profile, or on the leading edge of the auxiliary profile. Besides, the invention includes the possible use of all kinds of flaps used for practical purposes.

The relative position of the flap is either fixed or variable with respect to the profile and such that, under certain flying conditions of the aircraft, its presence, or a variation of its position considerably varies the aerodynamic field around the element on which it is mounted without substantially varying the chord corresponding to the whole of the profile and the flap.

The local variation of the aerodynamic field about one of the two elements of the slotted portion has for its effect (in view of the mutual interaction due to the slot effect) to change the aerodynamic field about the other element and, consequently, to modify the aerodynamic characteristics of the whole to a considerable degree.

According to the present invention, the presence of the secondary flap has not for its purpose considerably to increase the area of element on which it is placed since, as a rule, its bringing into play has for its consequence either to produce a variation which is substantially negligible, or a reduction of the relative chord of the whole of the element and the flap. In the particular cases where there is an increase of this relative chord, the fact will be mentioned hereinafter.

According to still another feature of the invention, I provide a particular displacement of the movable elements with respect to the body of the aircraft or with respect to one another. These relative displacements may occur according to any law as a function of time or space. Only the initial (normal flight) and final (lift increase flight) positions above described have a great importance. However, there are cases in which the displacement as a function of time has a great importance, for instance when it is desired to control the movable elements of the slotted portion separately through a suitable mechanism and successively. For instance, if, after having displaced the main or auxiliary wing, it is desired to make use of the secondary flap, either with a view to increasing the lift, or for destroying it, or for braking the movement of the aircraft. In a similar manner, it is clear that, in normal flight, the warping flaps will not act at the same time as the auxiliary wing. Besides, it may be advantageous to combine the different displacements of the supporting surfaces in such manner as to obtain a gradual effect.

The law of displacement of the two elements of the slotted portion with respect to the body of the aircraft also has a certain importance. According to the invention it may be advantageous (in order to avoid too violent aerodynamic reactions) to displace the movable elements in such manner that the different profiles move in their plane or in parallel planes and are given instantaneous rotations, translations or the like therein. Besides, I may effect these displacements in any suitable manner: for instance by general translations of the profiles the planes of which remain parallel to each other, or by a general pivoting about a point of the span, and so on, or again by suitable combinations of these elementary movements.

According to the invention, the various displacements of the two elements of the slotted portion may be either simple or complex. For instance, if the main wing is fixed, the auxiliary wing will move in the backward direction, either by a mere translatory displacement as a whole (the two half wings being rigidly interconnected) or by a translation of the central part followed by a rotation or pivoting of the two lateral half-wings fixed to the central part. If the auxiliary wing is fixed, as above the main wing will be given simple or complex displacements.

My invention applies to the case in which the two elements of the slotted portion are movable, for instance when the main wing moves forward with a translatory motion (the wing being made of a single unit) whereas the two auxiliary half-wings pivot symmetrically about an axis fixed on either side of the fuselage (or of the central portion of the auxiliary wing fixed to the fuselage).

It should be well understood that the expression "the wing moves forward or rearward" means that the mean general line (according to the span) of the wing moves forward or backward (for instance the line passing through the focuses of all the profiles).

Besides, the state of rest or of movement may, according to the invention, be accompanied by a variation of incidence of the profiles, as it is the case, for instance, for a rotation of the whole about an axis perpendicular or oblique to the plane of the profiles.

According to the invention, the displacement of the secondary flaps fixed to the main or auxiliary wings depends upon the type of flap that is employed. As a rule, this displacement consists of a rotation about an axis substantially parallel to the span of the flap. However, the invention applies to cases in which there are relative displacements which are more complicated, being analogous to those above described.

According to still another feature of the present invention, means are provided for guiding the elements of the slotted portion in their displacements with respect to the fuselage.

If the displacement is a mere rotation about an axis oblique or perpendicular to the plane of the profiles, this axis can be located close to the profile, for instance in the pivoting hinges of the flaps or as the axis of oscillation of the main wing of a composite wing of the "Mignet" type, or again the single axis of rotation of an auxiliary wing. If the axis is located at a relatively great distance from the profile, the movement can be obtained either by a connection making use of levers fixed to the profile and forming a rigid system turning about the axis, or by means of circular rolling tracks, making use either of wheels or rollers mounted on axes.

If the movement is a mere translation, it suffices to guide it either by slideways or by rectilinear rolling tracks said tracks being rigid with the fuselage or with the element to be displaced. If the translation is of the circular type, it is advantageous to make use of a parallelogram.

If the movement is more complicated, it is always possible to define the position of the profile of the element by the position of two points of its chord. The trajectory of one or both of these points will be adapted to the general movement to be obtained.

If the trajectory is rectilinear, the guiding will therefore be obtained through a continuous rectilinear path or a broken line path. If the trajectory is circular, use will be made of levers or of circular rolling tracks.

In the case of a guiding by means of a connecting rod system, according to the invention, in order to reduce the space corresponding to the movements of the parts of the system, at least one of these connecting rods is mounted in such manner that in normal flying position (the two elements of the slotted portion being juxtaposed) the straight line which extends between the points of articulation of said connecting rod will be intersected, in projection on the vertical plane of symmetry, by the basic chord of the outline of the profile along which the movable element of the wing is fixed to the fuselage.

If the trajectory is more complicated, use will be made of all suitable combinations, for instance by pivotally mounting the connecting rods on levers, or by associating movable slideways with levers, or fixed slideways on lever, or by making use of slideways turning about their ends and on which the profile moves, or again by utilizing rolling tracks of any suitable shape.

These displacements may be either discontinuous or continuous; for instance the guiding element may be provided with abutments of cams.

All these guiding means concern more particularly the profiles of the two elements of the slotted portion, but the invention applies also to the case of secondary flaps. I may make use of flaps with complex guiding means, such for instance as "Zapp" flaps.

It is obvious that the guiding of the longitudinal movement of the profiles must be completed by a transverse guiding. It is obtained, either by rolling tracks of suitable shape or by transverse bracing or by the very ridigity of the levers and of the suitable mountings, or by the control elements. In this case, it suffices to conjugate the displacements of two or more points located along the span.

The invention further contemplates the utilization of guiding or controlling means of the semi-rigid type (the control is rigid but it may become flexible when it is not in service) such for instance as rigid chains of the "Rackchain" type, or analogous devices.

According to still another feature of the present invention, I provide suitably guided means for controlling the movable elements. If the means are reversible, it will be necessary to compensate as much as possible the reactions, static as well as aerodynamic, exerted on said elements and to provide locking means. If use is made of flexible controls, it will be advantageous to make use of two cables such that each of them has one end which controls the backward movement of a profile while the other controls the frontward movement of another profile arranged symmetrically on the span of the wing, so as to ensure the parallelism of the displacement. Rigid control will be advantageously obtained either by levers, sliding bars, racks, and so on, or, preferably, by endless screws, which ensure an irreversible transmission. In all these control systems, the driving element will be adapted to the power that is required and the facilities of arrangement. For instance, I may make use of electric motors for operating the screws or turning axes, with a suitable reduction of speed.

I make use of hydraulic or pneumatic jacks for actuating the control rods of the levers which guide the displacements of the profiles. I may make use of wheels or the like utilizing the motive power resulting from the relative wind produced by the movement of the aircraft.

I may also make use of gravity, by taking advantage of the weight of certain elements. For instance the weight of a wheel may tend to produce a forward movement of wing elements.

I may also make use of a part of the power developed by the engines of the aircraft or any other motive power available on said aircraft.

Finally, in some cases, if the force to be exerted is relatively small, the elements can be actuated by the pilot or any other person present on the aircraft, either directly or by means of endless screw controls. Besides, the control of the different movable elements may be either separate or common, either simultaneous or not.

For instance, I may combine the displacement of a main wing with that of the secondary wing. I may also combine the displacement of a flap with that of the auxiliary wing. These displacements may also be made independent.

I may also, according to the present invention, provide the slotted portion of the supporting surface with auxiliary flaps, preferably disposed along the median slot, said flaps being subjected to the action of a control mechanism capable of producing a warping effect when flying with lift increase means in action, this mechanism then neutralizing the warping effect of the curvature flaps which are utilized in normal flying conditions as warping flaps.

The actuating means may be the same for all the movements or different for the respective movements. For instance the wing may be hydraulically controlled and the flap manually controlled.

According to another secondary feature of the invention, I provide means for wholly or partly balancing the aerodynamic efforts applied to the movable elements, in such manner as to reduce the driving power. Compensation may be obtained by means of elastic cables, or by means of springs, or by means of pneumatic or hydraulic jacks, or through an aerodynamic action. Aerodynamic compensation is obtained, according to the invention when the aerodynamic resultant on the movable profile passes through the instantaneous center of rotation thereof (in the case of a guiding by means of two connecting rods, the point where they intersect each other).

If the system is such that when the auxiliary wing is moving backward, the main wing is moving forward, aerodynamic compensation can also be ensured by connecting the two movements in a reversible manner in such way that, in the connecting means, the aerodynamic actions of one wing partly or wholly destroy those of the other. Gravity might also be used.

According to still another feature of my invention, the movement of the movable elements of the slotted portion is combined with the retracting movement of the retractable landing gear. The movement of the profile may result from the retracting movements of the landing gear or inversely.

Other features of the present invention will result from the following detailed description of some specific embodiments thereof with reference to the accompanying drawing given merely by way of example.

According to the first feature of the present invention, as above described, I provide at least one of the two elements of the slotted portion with a secondary flap. It should be well understood that, in this case, neither the main element nor the auxiliary element can be considered as a flap or the equivalent in view of the fact that they are both approximately of the same importance and, in particular, that the difference of their respective chords always ranges from 0 to 40% of that of the basic profile.

In accordance with this feature of the invention Fig. 1 shows, by way of example, the initial basic profile AENFIMA chosen from group 23,000 of NACA profiles. This profile has been split into two by line Mn in such manner as to constitute the main profile AENMA and the auxiliary profile MNFIM. Fig. 2 shows the same basic profile with the various characteristic points serving to the definition of the two elements of the slotted portion. Figs. 3 and 4 show the same profiles in the normal position of flight (median slot closed) and in the lift increase position (median slot open). In all these drawings, the main profile is designated by reference numeral 1 and the auxiliary profile by 2. Flaps are designated by reference numeral 3.

According to the above mentioned feature of my invention, secondary flaps may be provided either on 1 or on 2, or again both on 1 and 2.

Figure 5:
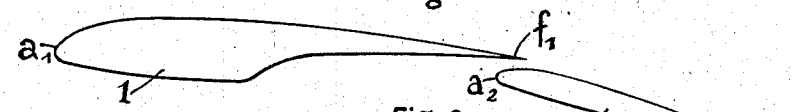
Figs. 5 to 13 show the contour of wings embodying the invention and provided with flaps on the two parts.

For instance, as shown by Fig. 5, the underside flap 3a is on 2.

Figure 6:
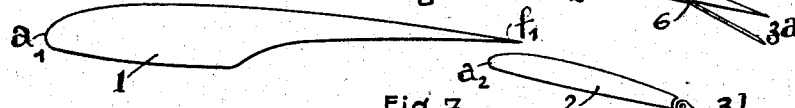

In the embodiment of Fig. 6, the curvature flap 3b is on 2.

Figure 7:
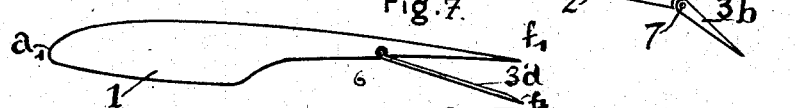

In the embodiment of Fig. 7, the underside flap 3a is on 1.

Figure 8:
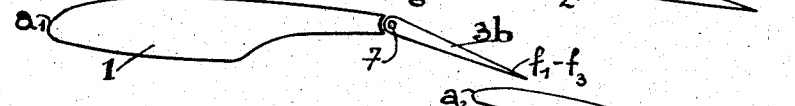

In the embodiment of Fig. 8, the curvature flap 3b is on 1.

Figure 9:
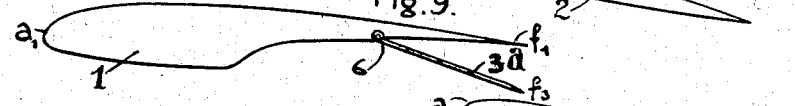

In the embodiment of Fig. 9, the underside flap 3a is on 1 and 2.

Figure 10:
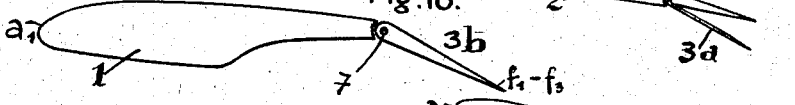

In the embodiment of Fig. 10, the curvature flap 3b is on 1 and the underside flap 3a is on 2.

Figure 11:
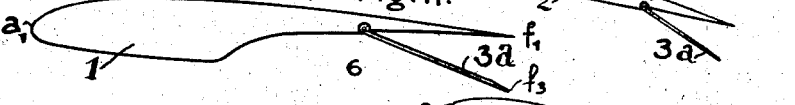

In the embodiment of Fig. 11, the underside flap 3a is on 1 and the curvature flap 3b is on 2.

Figure 12:
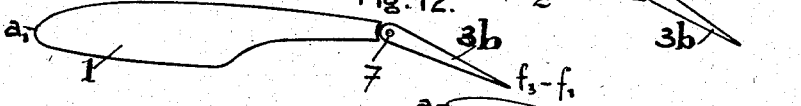

In the embodiment of Fig. 12, the curvature flap 3b is on 1 and 2.

Figure 13:
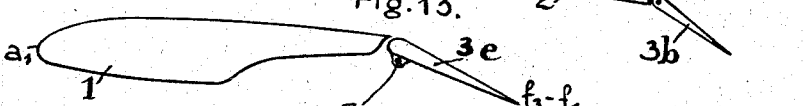

Finally, in the embodiment of Fig. 13, a slotted curvature flap 3e is mounted on 1. It might as well be mounted on 2.

For flaps without slots as shown by Figs. 14, 15 and 16, only the underside and the upperside of the flap are in contact with air in relative movement. Such flaps are well known and they are generally pivoted about axes O located either on the limit of the profile or inside the profile, at a distance from the trailing edge equal to, or slightly smaller than, the chord of the flap.

The slotted flaps are those the leading edge of which is in contact with the air in relative movement.

As a rule, it is advantageous to place the pivoting axis of the flap slightly below its chord and at a distance from the leading edge equal approximately to one fourth of its chord (Fig. 17).

The table of Fig. 18 gives particular values, by way of example. The axis is shown at D.

Figure 20:
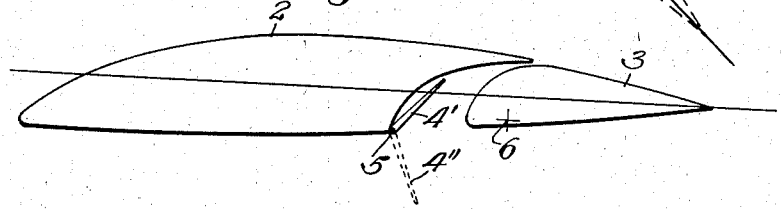
Figure 21:
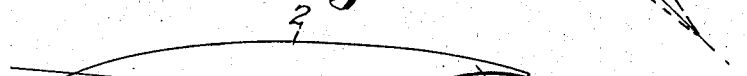

If it is desired to close the slot when the flap is not pivoted, I may employ various arrangements according to my invention. Figs. 19, 20 and 21 show a curvature flap (3 pivoted at 6 to profile 2) the slot of which is closed, in the arrangement of Fig. 19, by a small underside flap (4 pivoted at 5 to 2). The means for controlling 4 may be different from those for controlling 3 and it may act for warping purposes (position 4", Figs. 20 and 21).

Figure 22:
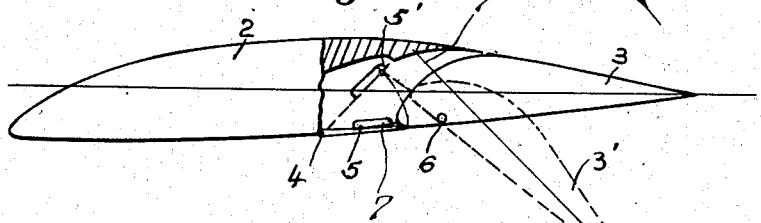
Fig. 22 shows controlling means for such a slot-closing flap.
Figure 35:
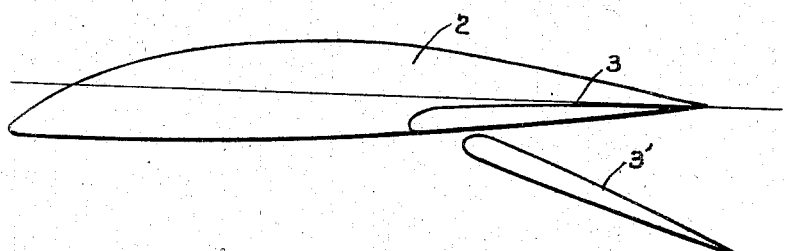
Figure 34:
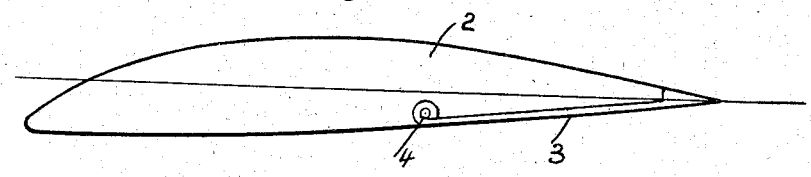
Figure 36:
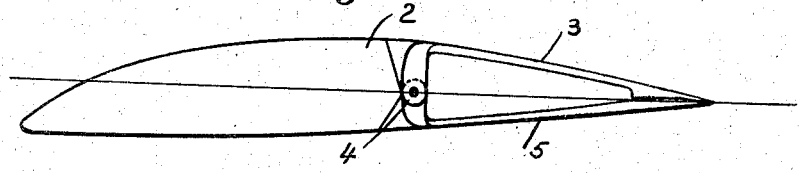

Fig. 22 shows the same arrangement in which the underside flap is controlled by a pin 5 fixed on the curvature flap 3 and sliding in a slideway provided on the underside flap.

Figure 23:
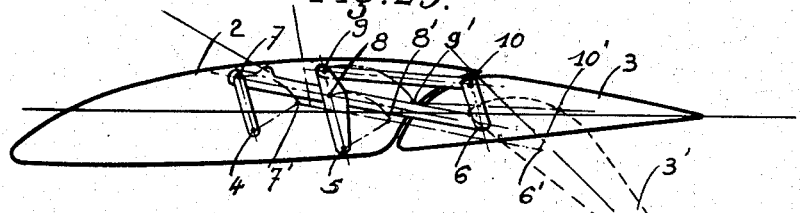

Fig. 23 shows an embodiment applicable to the case of a flap of the "Handley Page" type, in which the curvature flap is mounted at the end of pivoted rods. Axes 4 and 5 are fixed on wing 2. Connecting rod 7, 8, 6 is pivoted to the flap, as is connecting rod 9, 10.

Figure 24:
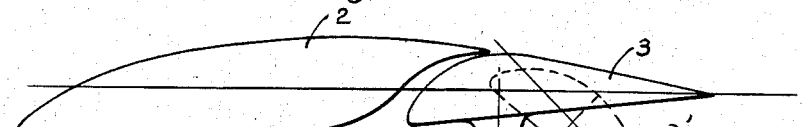
Figs. 23 and 24 show the mounting of different forms of slotted flap.

Fig. 24 shows the case in which axis 4 is relatively low.

Figs. 25, 26, 27, 28 show an embodiment in which the curvature flap is mounted on connecting rods 4, 5 which constituted a linked parallelogram.

The axes 4 are substantially vertical, whereas axes 5 are oblique in opening position (Fig. 27), which necessitates the downward pivoting of the flaps at the same time as the opening of the slot.

They are mounted at the end of an axis 6 which permits rotation during the closing.

This arrangement permits actuation through the end of the longitudinal frame member of the flap (jack 7).

Figs. 29 and 30 show an analogous solution in which the axes are parallel, which permits of avoiding the pivoting of the flap during the opening.

The flap 3 being itself articulated in its rear part, its curvature variations may be controlled at the same time as the slot is being opened, or it may be controlled separately if the flap is to be used as warping aileron.

The invention further includes the use of ailerons with a slot into which air is blown from the engine plant or from local air intakes (making use of the relative wind).

Fig. 31 shows an embodiment in which the air is fed through the tubular axis 4. When the aileron is turned downwardly, holes 6 and 7 come into coincidence and air is blown through the upper slot. If the aileron is pivoted upwardly, the lower holes feed air to the other slot.

Figs. 32 and 33 show another embodiment in which I have provided two fixed channels for the flow of air under pressure, small wings 5 being provided in addition for conveying and distributing air.

As above explained, the trailing edge flap can also be mounted on the main element. In particular, it can, in this case, be used as warping flap.

Figure 37:
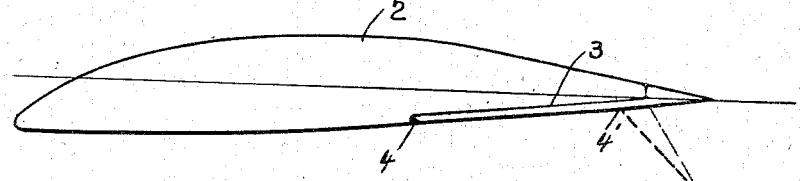

The underside or upperside flaps may be of the conventional type (Fig. 34) or of the slotted type (Fig. 35) or of combined types (Fig. 36, underside and upperside flaps 5 and 3), and their displacement may be either simple or complex, Fig. 37 (flap of the Zapp type). Besides they may be combined with curvature flaps.

According to the invention, the flap modifies the aerodynamic field of element 2, without substantially increasing the relative chord of the whole. However, according to a particular embodiment of the invention, I make use of flaps of the "Fowler type" which increase the chord, provided that they are associated with another feature of the invention.

According to another characteristic feature of the present invention, underside flaps may also be mounted on the main profile. Fig. 38 shows such a flap 3 pivoted at 4 to the longitudinal spar of element 1, in such manner that, in normal flight it closes the median slot.

Figs. 41–43 show a flap 3 mounted on a wheel shock absorber 5 which, in normal flight conditions, is housed in the median slot and hidden by 3. The shock absorber is pivoted at 3 on the main spar of the auxiliary element 2. In Fig. 39, flap 3 has slid against the underside and has come at 3'. In Fig. 40 and Fig. 44, the flap is made of elements 5 articulated on axes 4 located in the plane of the profiles.

Figure 45:
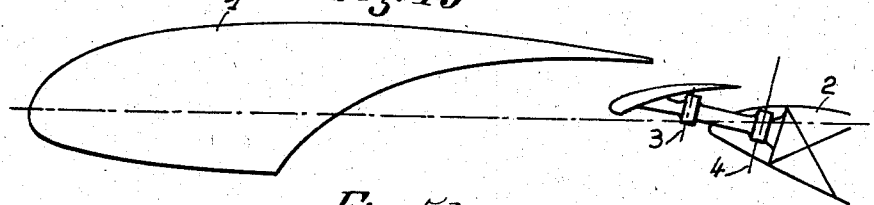

The internal leading edge flaps are, as a rule, movable members of the kind of Handley Page slots. Fig. 45 shows a flap of this kind which is normally applied against profile 2 and which, in flight with the lift increase means in action, is moved away by means of pivoted rods forming a parallelogram.

Figure 46:
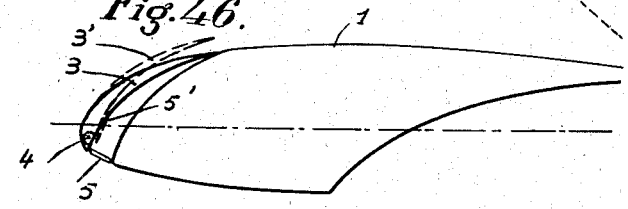

Fig. 46 shows a flap of the Maxwell type cooperating with the leading edge of profile 1.

I call "external flap" a flap which is mounted in such manner that, in normal flying position, its profile is located on the outside or on the outer limit of the profile in which it is placed. As above the same groups may be differentiated:

The trailing edge flaps will have, preferably (Fig. 47) a thin profile arranged in such manner that their leading edge comes on the vertical line of the trailing edge (flaps of the Junkers aileron type) of the wing.

They are pivoted on an axis generally located on the chord at a distance equal to 25% of said chord from the leading edge and they may be used for warping purposes.

The leading edge flaps may be either fixed or movable. If they are placed on element 2, they are generally intended to modify the conditions of flow in the slot between 1 and 2.

Figure 48:
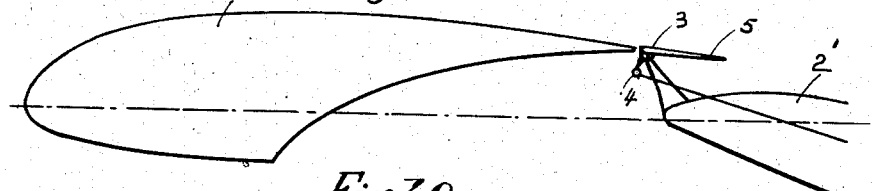

Fig. 48 shows a flap 5 pivoted at 3 and controlled by a rod articulated at 4. In the closed position, the flap can be housed in element 1 by making use of special arrangements disclosed by Figs. 86, 87 and 88, which show the arrangement of a flap 3 fixed on the leading edge of the element 2.

Figure 49:
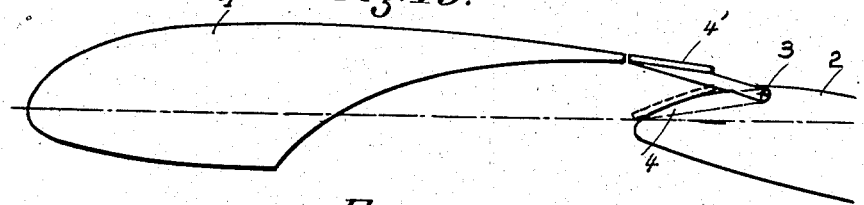

Fig. 49 illustrates another solution in which flap 4 is articulated through the intermediate of a lever oscillating at 3 on element 2.

Fig. 50 shows still another embodiment, in which the flap is articulated through two connecting rods 3—5 and 4—6, in such manner that in normal flying conditions it is placed on the underside of the basic profile and comes to obturate the median slot.

Figure 51:
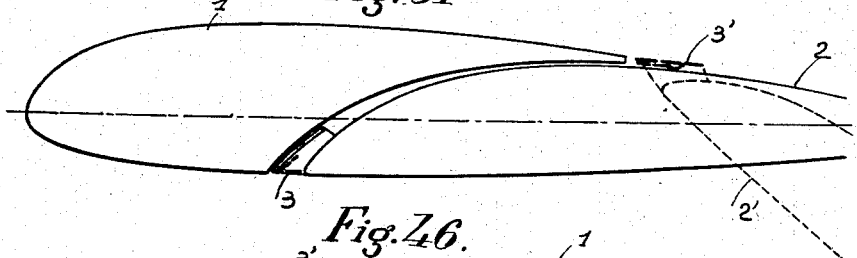

Fig. 51 shows a modification in which the flap is fixed and is provided with an articulated slot obturator 3.

In all cases, the flap is mounted on the leading edge of element 2 and in flight with the lift increase means in action, it comes substantially in line with the trailing edge of element 1. These flaps may be used for warping purposes.

If the leading edge flap is mounted on the main part 1, I obtain either a fixed nose of the "Potez" type or a Handley Page slot.

In some forms, the slotted portion is carried by the front upper plane. But the invention includes the other case, to wit that in which a biplane structure having one wing ahead of the other has its rear wing provided with a slotted portion such that when the main portion 1 moves its leading edge toward the front, said edge comes close to the trailing edge of the front upper wing.

If the presence of the auxiliary wing 2 creates constructional difficulties for the supports thereof and also exaggerate stresses on the main wing 1, it is advantageous, according to a third feature of the present invention, to devise the auxiliary wing 3 in such manner that it is sufficiently thick for being supported either wholly or partly by the fuselage. When it is supported solely by the fuselage it may be wholly in overhanging position (Fig. 66) or again by struts and rods (Fig. 65) or rods (Fig. 59) or again by struts and rods (Fig. 82).

When it is partly supported by the fuselage, it will be preferably engaged, either wholly or partly therein, and supported, at one or several points on the main wing. These points are preferably, either the end of the auxiliary wing or the engine supporting elements, the landing gear support, the points of fixation of the fuselage beam, and so on. If the engagement on the fuselage is not perfect, it is preferable to provide an articulation about an inclined axis as shown for instance by Fig. 53. This articulation permits of obtaining a partial engagement which will be advantageously completed by a supplementary support at the end of the auxiliary wing (Fig. 54). Finally, if necessary, the supports may be combined on the fuselage and the main wing, either by the adjunction of articulated rods, or by means of slideways. In any case, the connections between the auxiliary and main wings will be limited and will act at the same time as guiding means in the relative movement or as supplementary connection adapted to prevent relative vibrations. Besides, it is possible, according to the invention, to provide the inertia of each of the two elements in such manner that each of them dynamically absorbs the vibration of the other or that some connections act as vibration dampers.

It is also possible to take advantage of the rigidity of the auxiliary profile 2, thus made thicker, for causing it to support the thinned trailing edge of the main profile 1 (Fig. 60) by means of suitable supports permitting the relative displacements of the profiles.

In order to correct the effects of the displacement of the aerodynamic thrust center with respect to the body of the aircraft, I can either make use of the conventional means (such for instance as the variation of position of the stabilizer), or, according to the fourth feature of the present invention, arrange the slotted portion in such manner that the variation of area is provided, at least partly, by a forward movement of the main wing 1 with respect to the body of the aircraft (Figs. 56 to 66). As the auxiliary wing 2 can be either stationary (Figs. 62–63 or movable (Figs. 56, 66, 64) with respect to said body, this arrangement permits of compensating as exactly as possible for the variations of position of the center of thrust during the movement of the elements of the slotted portion away from each other.

Besides, the forward movement of the main wing may be accompanied by a variation of its incidence with respect to the body of the aircraft. This variation will be for instance preferably positive, (if the tail elements are fixed on the body of the aircraft). This condition is complied with by making use, for instance, of an arrangement analogous to that of Fig. 56. It will be preferably negative if the tail portions are fixed to the main wing, for instance through beams as in Figs. 62–63.

This variation of incidence permits in both cases of keeping a relatively small incidence of the horizontal tail elements, which improves stability when flying with the lift increase means in action or when landing.

If, on the contrary, the forward movement of wing 1 is not accompanied by a substantial variation of its incidence with respect to the body of the aircraft it is possible, according to the present invention, to tilt the auxiliary wing upwardly. This upward tilting can be effected by a simple rotation about an axis perpendicular or oblique to the plane of symmetry, or it may be accompanied by a translation in the forward or backward direction.

Fig. 60 is a profile view of the rear end of a system 1, 2, 3 the essential characteristic of which is that the relative movement of 2 with respect to 1 is a mere rotation (point Y associated with the chord comes at Y'; the perpendicular YZ to the chord comes at Y'Z' after rotation about the point 10 of intersection of YZ and Y'Z', Figs. 79–80).

Profile 2 carries a fixed nose 5 at the front of the leading edge. This nose prolongs the upperside of profile 1 and is adapted to slide in grooves 77 (having their center at 10) arranged along ribs 76 provided on the end of 1, the rear covering of the underside of 1 being dispensed with.

Fig. 61 shows a transverse section at the place of the slot.

Fig. 63 shows an application of the preceding device to an airplane having as its essential feature that the auxiliary wing 2' is fixed on the fuselage 27' and the main wing 1 supports the tail elements through the intermediate of beams 26. The wing 1 is engaged at 8 on a lever 17 which oscillates on the axis 10 fixed to the fuselage. The landing gear 23—23' is retracted.

Fig. 62 shows the same system in flight with the lift increase devices in action. Fuselage 27 oscillates at 10 while the tail elements remain in line of flight. The landing gear 22—33 is expanded.

Figs. 56 and 57 show in side view and in front view respectively, the case in which the main wing 1 moves forward with a translatory movement such that its incidence does not vary. The wing 1 is constituted by a big spar 39 which extends through the fuselage and is supported by two rigid frames 17 and 18 articulated at 10 and 11 to the fuselage and at 8 and 9 to the main spar.

The increase of incidence of the auxiliary element can then be obtained in various ways.

According to a first embodiment (Figs. 64 and 65) the auxiliary wing 2 is caused to turn about an axis 7 at right angles to the plane of symmetry.

In this case, the wing 2 may be made of a single element and include, for supporting axis 7, a continuous spar 8 extending across the fuselage, which spar may be either in overhanging position, or braced by cords or wires (8).

The displacement of the main element 1 toward the front may be obtained either by means of connecting rods 6—5 snf 4—3 (Figs. 64 and 65) or by means of slideways, these slideways being either rigid with the fuselage as in Fig. 66 or rigid with the wing as in Fig. 50.

The rotation of element 2 can be combined with the displacement of element 4 or produced separately. In this latter case, it is possible, according to a feature of the invention to utilize it as elevator element for the aircraft.

Axis 7 may be fixed either under the spar (Fig. 64) or above it, or on the inside, or again ahead thereof, as shown by Fig. 66.

According to another embodiment of the invention, care is taken that the increase of incidence of the auxiliary element is produced by a rotation about an axis oblique with respect to the plane of symmetry.

In this case, it is necessary to constitute this element of two parts articulated on either side of said plane symmetry.

Figs. 52, 53, 54 illustrate the application of this embodiment to an airplane the engine 8 of which is located behind the pilot and controls, through a transmission shaft 12, two propellers 10 turning in opposed directions. The wheels 9 can be retracted at 9' on the sides of the fuselage. As in the preceding case, the main wing 1 moves forward with respect to the fuselage when flying with the lift increase devices in action and it is mounted on a system of two articulated connecting rods (connecting rod 3—4 is constituted by a rigid frame 7 on the inside of the fuselage).

The wing 2 is made of two portions, each spar 14 carrying, at its end, a hinge (o, o') which enables it to turn about an axis oo' fixed on the fuselage obliquely with respect to the plane of symmetry.

If, in the front view of Fig. 53, the two axes oo' converge in a downward direction, the increase of incidence of 2 will be obtained by causing the element to turn about oo' in such manner that the end of each half-wing moves toward the front (Fig. 54) at the same time as element 1.

If, on the contrary, the axes converge toward the top, it will be necessary to produce rotation in the opposite direction about oo' for obtaining the increase of incidence.

Besides, the axis oo' might be also materialized by a swivel joint mounted at the end of the spar, the latter being supported at a second point by a bar or by the spar 13 of element 1.

As in the preceding examples, the displacements of element 2 may be either conjugated or independent with respect to those of element 1. In this case, I may also arrange that the dissymmetrical displacement of the two half-wings acts as elevator element and as warping element.

If the upward tilting of the auxiliary wing is accompanied by a translatory movement, this movement may for instance be obtained as in Fig. 59 by means of articulated connecting rods 17 and 18 fixed to the fuselage. The translatory movement may also be lateral, the operating means being for instance analogous to those used in the embodiments of Figs. 25, 26 and 28 for controlling flap 3, which is given both an upward tilting movement and a lateral translatory movement.

According to still another feature of the present invention, when the wing is of trapezoidal shape and the relative displacement of the two elements of the slotted portion is effected by a translation parallel to the plane of symmetry, I fix the basic profiles of fixation to the body in negative position in such manner as to improve the slot effect according to the wing span.

Then, I arrange the parts in such manner that the leading edge of the auxiliary profile comes close to the trailing edge of the main profile, over its whole length, whatever be the shape, in plane projection, of the elements which constitute the slotted portion of the wing.

This condition is naturally complied with when the wing is rectangular and the basic profiles have the same chord and the same overlap. According to the present invention, this condition is complied with, in the case of a trapezoidal wing of evolutive profile, by giving element 2, with respect to element 1, a combined relative movement of translation and rotation (in the plan view).

According to one embodiment, I provide an axis O which is fixed on the fuselage or the central portion of wing 2 which is fixed to the fuselage and the element 1 capable of moving forward by translation, as shown by Figs. 52, 53 and 54.

The inclination of axis OO' permits of obtaining both the positive pivoting of profile 2 and the rotation in plan view toward the front which maintains the maximum efficiency of the slot over the whole wing span.

Fig. 54 shows an embodiment of the conjugation of the displacements of elements 1 and 2.

The end 15 of the spar 14 of element 2 is articulated on a connecting rod 17 itself articulated at 16 to the spar 13 of element 1.

In closed position, I may provide means for locking said end 15 on the spar 13. The whole is housed in the round end of element 1.

It should be noted that the two half-wings can be actuated differentially by displacing for instance one of the axes 15 or 16 with respect to its support (spar 14 or 13).

Fig. 55 shows the detail of such an embodiment.

The axis 16 is mounted on a tube 18 sliding along spar 13 and supported by rollers 19.

According to still another feature of the present invention, I omit, either partly or wholly, the rear covering of the underside of the profile of the main element (covering located on the inside of the basic profile). This covering corresponds to the theoretical split line MN (Fig. 2).

In this case, only the ribs remain and support the rear part of the upperside.

Fig. 68 shows an embodiment in which the covering 4 is maintained merely in the vicinity of the underside (a fixed flap 3 is mounted on 2).

Fig. 69 shows an embodiment in which the covering is made of two parts 4 and 5 interrupted in the middle of the profile in such manner as to afford a passage for a nose 3 fixed to element 2.

Figs. 70 and 71 illustrate the case in which the covering is wholly removed. In Fig. 70 the leading edge of element 2 which follows the covering of the underside of element corresponds to the leading edge of the element 2 of Fig. 71, which is located on the inside of said covering.

Besides, this covering portion (Fig. 72) may be pivotally mounted as already described (underside flap 3 articulated at 4 on 1).

The total or partial absence of the covering facilitates the housing of annexed elements or articles (bomb, fuze, tank, radiator, flap controls, wheels of landing gear, etc.).

Besides, experience has taught that the aerodynamic flow is improved and the lift and drag characteristics are better under these conditions. Fig. 73 shows the case in which, the covering having been removed, I have placed a wheel (of the landing gear in the retracted position) passing through the hole provided in the spar.

Fig. 67 shows the detail of construction of an embodiment of this arrangement. The main wing is constituted by spar which is subjected to bending stresses, the core 5 of which is substantially at 25% from the leading edge of the basic profile. The web, stiffened by sectional irons carries two flanges 4 made riveted L irons or sectional irons shaped to the measure. The spar supports the ribs of the leading edge which support the covering of the leading edge, which undergoes twisting stresses. The spar also supports the ribs 8 of the trailing edge, on which the covering of the upperside is fixed as far as the trailing edge.

There is no covering on the underside.

The element 2, in its normal flying position comes to prolong (along the under side) the lower flange of the spar.

According to still another feature of the invention, I provide the possibility of utilizing the orifice left in the fuselage by the displacement of one of the elements of the slotted portion for one of the following purposes:

a. Either for dropping a load (gasoline tank, bomb, etc.);
b. For observing the ground;
c. For permitting the passage of a retractable element of the landing gear;
d. For firing a machine gun or the like.

Fig. 66 shows an application of this feature of the invention to a fighting plane.

This arrangement is the more advantageous as the disengagement of said orifice corresponds to flying with the lift increase means in action, that is to say to slow flying (which is most favorable to the objects above mentioned).

It will be clearly understood that, in the flying position in which the lift increase devices are in operation, the wing 1 that is moved forward has cleared the orifice for the passage of bomb 12 and also the space for firing the machine gun 13. In this embodiment, the roller track for carriage 6 belongs to the engine frame and transmits the stresses from the main element 1 to the main frame 11 of the fuselage.

On this frame is articulated at 7 the auxiliary wing 2 which is held by a connection 14 of variable length (endless screw, hydraulic jack, etc.).

I may, as shown by Fig. 67, retract the wheels toward the front (under normal flying conditions) into the place that was occupied (when the lift increase devices were in action) by the box-shaped spar of the main element 1'. A similar arrangement is shown by Fig. 56.

Besides, as shown by Fig. 73, in order to move the wheel downwardly, the main wing 1 must move forward in such manner as to disengage it from the spar.

Another feature of the present invention relates to the tracing of the theoretical split line which determines the two main and auxiliary profiles. The curve $y = f(x)$ which seems to be the best is given by the data of the table of Fig. 42, which gives, for the different values of $x$ the best possible value of $y$ and the acceptable limits for $y$.

According to the third feature of the invention, means are provided for guiding the movable elements of the slotted portion. By way of example, the chief types of guiding means are indicated in the following figures:

Fig. 74 shows the end of the wing 1 fixed on the fuselage. The wing 2 in solid lines is shown in the rear position (in dotted lines in the retracted position). The wing 2 is articulated at 8 and 9 on two levers 17 and 18 oscillating on two fixed points 10 and 11 located under 8 and 9 on the fuselage. The movement is controlled by an endless screw which engages in a nut 16 adapted to oscillate at 8. The underside flap 3a is actuated through a connecting rod 14 mounted on 18. The curvature flap 36, pivoted at 7 on 1, is differentially controlled and acts as curvature flap and warping element.

Fig. 75 shows the same system as above. The fixed point 11 of articulation of lever 18 is located above point 9. Point 10, instead of being fixed, is articulated to the end of a lever 19 oscillating on the fuselage about axis 12. The curvature flap 3b articulated on 1 is actuated directly by the connecting rod 14 itself controlled by a lever rigid with 18.

Fig. 76 shows a modification of Fig. 75. Point 8 is guided in a slideway 13 fixed on the fuselage. The underside flap 3a is actuated by a small lever which oscillates when it comes into contact with a cam 26 fixed on the fuselage.

Figs. 77 to 79 show a single engine touring plane of the low wing type.

The engine is at the rear of the fuselage 27 and it drives the propeller 21. The two rear wheels 22 are mounted on the rear spar of 1. The front wheel 23 fixed to the fuselage can be steered. The horizontal tail unit 24 is supported by two beams 26 fixed on 1. The guiding of 2 is effected by means of levers 17 and 18 the points of articulation 10 and 11 of which are fixed on 26. The underside flap 3a mounted on 1 is controlled in the same manner as the flap 36 of Fig. 75.

Figs. 56 and 57 are a side view and a front view of details of the guiding of a main wing 1, in its movement with respect to fuselage 27.

The spar 39 is of the box-like type and it extends through the fuselage 27. It is articulated at 8 and 9 on the levers 17 and 18, which are constituted by indeformable and oscillating frames and pivoted to fuselage 27 about axes 10 and 11. The control is effected through screws 15, which constitute the diagonals of the quadrilaterals 8, 9, 10, 11. They are constituted by toothed pinions articulated at 10 and they are screwed in oscillating nuts at 9. The nose 5 moves as a consequence of the sliding displacement of the supports 45 which are actuated by forked levers 46 themselves controlled by the relative movement of levers 17.

The wheels 22 are mounted on the inclined rods 40, which oscillate on the inclined axis 42 mounted on the boxlike structure 33. A connecting rod 41 mounted on axis 43, fixed on the fuselage, actuates the member 40. With this arrangement, when the wing moves rearwardly, the wheel is retracted and owing to the inclination of axis 42 it is housed under the fuselage.

Fig. 80 shows an element, in transverse section, of the guiding of a wing by a roller. The roller 48 is cylindrical and carries at each end a conical part which acts as an abutment. It rolls in roller tracks 49 and 50 one of which is connected to the wing, the other to the fuselage. These tracks are of appropriate section. They are either rectilinear or circular.

Fig. 81 shows, in transverse section, a device for guiding a wing by means of a roller. The roller 47, which is conical (so as to be able to act as an abutment) is mounted, through needle bearings, on an axis 51 which is connected to the wing through support 50. The roller track is of a section corresponding to that of the roller and it is mounted on the fuselage through the intermediate of the support 49. This track is rectilinear or curved.

Fig. 58 shows the guiding of a main wing 1 by means of rollers. But in opposition to the device of Fig. 81, the axes of the rollers are mounted in stationary position on the fuselage and the roller tracks are mounted on the support 49 fixed on the boxlike structure of the wing 1.

According to another feature of the invention, I have recourse, in order to ensure the guiding of the movable element, to simple or multiple tubular roller tracks for rollers having a circular generatrix.

I may then distinguish between the inner roller tracks and the outer roller tracks, the latter being themselves either connected to the fuselage or connected to the profile to be displaced.

Fig. 82 shows the detail of the arrangement of a roller A. It is supported by an axis 4 mounted on a ball bearing 5 which is housed in a cage supported by carriage 8. The roller is made of two pieces and it has circular generatrices. It carries, near the top, on the tubular jacket 7 which is housed in support 6, a rubber stopper which prevents dust from penetrating inside the tube.

Fig. 83 shows the detail of the roller B which extends downwardly. Its roller cage 10 is provided with an eccentric bore and a series of teeth 12 which permits of varying the eccentricity through the intermediate of a pinion 11 shown on Fig. 84.

This Figure 84 is a diagrammatical view of a roller carriage mounted on the box-like spar of the main wing of the airplane of Fig. 66. On either side of the fuselage, the carriage is provided with two rollers A which roll on the inside of the tubular roller track. A roller B, located between the two above-mentioned rollers, serves to maintain the pressure (toward the top) of rollers A, by bearing downwardly. Its axis is mounted on an eccentric which permits of adjusting the clearances.

I have stated above that it is possible to have recourse to articulated frames or connecting rods for guiding the displacements of the movable element.

According to a feature of the present invention, the space occupied by this device is reduced by arranging things in such manner that, in normal flying position, the straight line which extends from one articulation to the other is intersected by the basic chord of the fixation profile (in projection on the vertical plane of symmetry).

Fig. 85 shows three possible positions a, b and c of the axis fixed to the fuselage and four possible positions 1, 2, 3 and 4 of the axis fixed on wing 2.

It will be seen that the position b—3 which intersects the basic chord is that which corresponds to the minimum space occupied.

The best positions are those for which the point of intersection is in the vicinity of the median portion of the line of the two axes.

According to still another feature of the invention, I provide special means for controlling the movable elements of the slotted portion. In particular, these control means may be so designed as to permit the piloting of the airplane either directly by the pilot or automatically through the intermediate of suitable servo-motors.

For instance, according to an embodiment, in order to produce the vertical displacements of the aircraft, I make use of one or several of the elements movable with respect to the wings. For this purpose, I may choose either of acting upon the main wings or on the auxiliary wings 3. Preferably, I will act on the secondary flaps, which are easier to control. For instance, if the flap is mounted on 2, as in Fig. 59, it will suffice, through a suitable control, to modify the incidence of the flap independently of the movement of 2.

According to another secondary arrangement, in order to obtain the desired warping of the wings of the airplane, I make use of one or several movable elements which constitute the lift increase devices of the wing system. I can therefore, as above, act on elements 1, 2, 3. It will suffice, for this purpose, to make the movable element that is considered of at least two parts symmetrical with respect to the plane of symmetry of the aircraft, so as to actuate them unequally and to create the dissymmetry of aerodynamic reaction which is necessary for said control. If wing 2 is used for warping purposes, I may, for instance utilize, as in Figs. 54 and 55, of the displacement of the fixation end 16 of the wing. As above, it is more natural to employ the secondary flap differentially.

Fig. 59 shows the control of the displacement of an auxiliary wing 2 which carries a curvature flap 3e adapted to act either as warping aileron or as elevator. The guiding of the wing proper is similar to that of the wing 1 of Fig. 56. The control is effected by associating connecting rod 17 with the connecting rod 18' of wing 1 through a bar 52. On the fixed shaft 11, there is mounted a lever 53 which actuates, through rod 54, a lever mounted on 9 and controlling flap 3e through the intermediate of bar 55, in such manner that if the lever is fixed with respect to the fuselage, when wing 2 moves toward the rear, flap 3e is moved downwardly. On the contrary, lever 3e can be controlled through the intermediate of lever 53 independently of the movement of 2, and this in both directions, and utilize it, either for warping or for controlling the inclination of the aircraft, or for both of these purposes.

According to the invention, I may further provide a mechanism for eliminating the warping action when the aircraft is flying with the lift increase means in action, this mechanism bringing into play other flaps (generally located at the place of the median slot) which permit of obtaining the warping effect without risking to produce an unfavorable nosing torque.

Fig. 86 shows a particular embodiment of this arrangement.

According to this embodiment, the two curvature ailerons located on either side of the plane of symmetry of the airplane are controlled in opposite directions by a pair of axes 11 located inside the fuselage.

Each of these two axes controls a lever 10 adapted to slide on said axis in such manner as to vary the control leverage acting through the intermediate of connecting rods 8 and 9 on two levers 6 and 7 mounted on the axis 5 about which wing 2 is pivoted. Lever 6 controls the warping of flap 4' and lever 7 controls the warping of flap 3'.

The position of slideway 10 is associated with the inclination of wing 2 in such manner that, under normal flying conditions, the movement of rotation of axis 11 acts merely upon the curvature flap which acts to effect a warping action. Fig. 86 shows the position when the lift increase effect is obtained, in which position the slideway is in its upper position so that the rotation of axis 11 acts merely upon the displacement of 4'. Besides, it will be understood that if axis 11 is not controlled, no warping takes place when the pivoting of element is controlled.

Levers 6 and 7, which are stationary with respect to the fuselage, are given, with respect to element 2, a relative movement in the opposite direction, which has for its effect to produce the tilting of the curvature flap 3 and the inclination of the flap 4.

Besides, flap 4 is mounted oscillating on lever 12, the latter being connected to the fuselage through the end 13 of a connecting rod.

It will be readily understood that the mechanism for passing the warping displacement, either through flap 4 or through flap 3, is based upon the variation of length of the lever arms due to the oscillating slideway.

The present further includes other means, such for instance as the mounting of connecting rods 8 and 9 on the ends of oscillating levers themselves mounted on the lever for controlling warping in such manner as to vary the effective length of the control lever arm.

Finally, I may provide all suitable means for uncoupling one of the flaps and coupling the other.

According to another secondary feature of the invention, in order to ensure a steering control, I provide one or several movable elements 1, 2, 3 and I give these elements a sufficient dihedral angle, while making use of a suitable control. In the arrangements above described, it will be of course possible to eliminate the conventional control member which is replaced by elements 1, 2, 3, 4.

According to still another feature of the invention, I combine the movement of one of the movable elements of the slotted portion with the movement of the landing gear when the latter is of the retractable type. This movement may be either irreversible or reversible and the control may be effected either by the displacement of the landing gear or by that of the movable element of the slotted structure.

Fig. 85 shows the profile of the front part of a twin-engined airplane of the low wing type.

In Fig. 56, means for producing the forward movement of the main wing actuates the wheel through the intermediate of connecting rod 41 fixed to the fuselage through the swivel joint 43.

A last feature of my invention is concerned with all the relative position which may be occupied by the supporting system including a slotted portion with respect to the body of the aircraft.

In particular, the main wing 1 may be of the high type (Figs. 53–65) or it may be of the low type (Fig. 77) or it may be located at an intermediate height with respect to the body of the airplane. It may be fixed or movable with respect thereto. It may be overhung or braced. The auxiliary wing 2 may be either supported merely by the body of the aircraft and rigidly connected therewith or movable with respect thereto. It may be supported directly by said body or through the intermediate of interposed elements. It may also bear upon the main wing but preferably at limited points and, as far as possible, through the intermediate of other main elements such for instance as the tail unit beams, the engine nacelles or the landing gears.

The auxiliary wing, as well as the main wing may support essential elements of the airplane, such for instance as engines, landing gears, tail unit beams, tanks, radiators, firearms or explosive engines, etc.

In particular, in the case of a low wing twin-engined airplane, the auxiliary part 2 will be advantageously, according to the invention, made of three elements: A central element, rigid with the fuselage and each end of which carries the engine support, the landing gear and one of the two other elements, articulated about axes inclined as shown by Fig. 54.

When the main wing is moved forward (as in Fig. 66) it may happen that the box-like spar (for centering reasons) is too near to the engine. In this case, according to the invention, said spar is built in such manner that, seen in horizontal projection, the leading edge includes a central portion which is at the rear of the remainder of said leading edge.

Furthermore, this shape improves the flow at the place where the wing is joined to the fuselage by giving the leading edge seen in plan view, the shape of a flattened M. In order to improve the joining of the trailing edge, I may further provide an intermediate portion of the wing 2 which is articulated both to the fuselage and to the rear part of 2 close to the fuselage, when 2 is pivoted (bellows, articulated panel, etc.).

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the companying claims.

What I claim is:

1. An aircraft which comprises, in combination, a body, at least one supporting surface, associated with said body, having a slotted portion constituted by a front element and a rear element each of a chord length equal to at least 60 per cent of the total chord length of said portion of the supporting surface, and means for imparting a fore-and-aft relative displacement to said two elements, including a forward displacement of the front element with respect to said body, this displacement being of an amplitude such that the leading edge of the rear element can come substantially into the vertical plane of the trailing edge of the front element.

2. An aircraft which comprises, in combination, a body, at least one supporting surface, associated with said body, having a slotted portion constituted by a front element and a rear element each of a chord length equal to at least 60 per cent of the total chord length of said portion of the supporting surface, and means for imparting such a fore-and-aft relative displacement to said two elements as to produce no variation of the position of the center of thrust of the whole of said supporting surface with respect to said body, said relative displacement including a forward displacement of the front element with respect to said body, this displacement being of an amplitude such that the leading edge of the rear element can come substantially into the vertical plane of the trailing edge of the front element.

3. An aircraft which comprises, in combination, a body, at least one supporting surface, associated with said body, constituted by a wing of trapezoidal outline in plan view and of slotted structure composed of a front element and a rear element each of a chord length equal to at least 60 per cent of the total chord length of said surface, the basic profiles of the tip parts of said wing having a negative incidence with respect to the basic profile of the middle part thereof, and means for imparting a fore-and-aft relative displacement to said two elements, including a forward displacement of the front element with respect to said body, this displacement being of an amplitude such that the leading edge of the rear element can come substantially into the vertical plane of the trailing edge of the front element.

4. An aircraft which comprises, in combination, a fuselage, at least one wing associated with said fuselage, said wing being of slotted structure constituted by a front element and a rear element each of a chord length equal to at least 60 per cent of the total chord length of said wing, both of these elements being movable with respect to said fuselage, means carried by said fuselage for guiding said elements, and means for imparting a fore-and-aft relative displacement to said two elements, including a forward displacement of the front element with respect to said fuselage, this displacement being of an amplitude such that the leading edge of the rear element can come substantially into the vertical plane of the trailing edge of the front element.

5. An aircraft which comprises, in combination, a fuselage, at least one wing associated with said fuselage, said wing being of slotted structure constituted by a front element and a rear element each of a chord length equal to at least 60 per cent of the total chord length of said wing, means for imparting a fore-and-aft relative displacement to said two elements, including a forward displacement of the front element with respect to said fuselage, this relative displacement being of an amplitude such that the leading edge of the rear element can come substantially into the vertical plane of the trailing edge of the front element, a retractable landing gear associated with said aircraft, and means interconnecting the parts of said landing gear which are movable with respect to said fuselage with the means for producing a fore-and-aft relative displacement of said two wing elements.

6. An aircraft which comprises, in combination, a fuselage, at least one wing associated with said fuselage, said wing being of slotted structure constituted by a front element and a rear element each of a chord length equal to at least 60 per cent of the total chord length of said wing, means for imparting a fore-and-aft relative displacement to said two elements, including a forward displacement of the front element with respect to said fuselage, this relative displacement being of an amplitude such that the leading edge of the rear element can come substantially into the vertical plane of the trailing edge of the front element, a retractable landing gear associated with said aircraft, and means for controlling said landing gear, the means for imparting a fore-and-aft relative displacement to said two wing elements being operatively connected with the parts of said retractable landing gear movable with respect to said fuselage, whereby operation of said landing gear under the effect of the associated controlling means produces a relative movement of said wing elements.

7. An aircraft which comprises, in combination, a fuselage, at least one wing associated with said fuselage, said wing being of slotted structure constituted by a front element and a rear element each of a chord length equal to at least 60 per cent of the total chord length of said wing, means for imparting a fore-and-aft relative displacement to said two elements, including a forward displacement of the front element with respect to the fuselage, this relative displacement being of an amplitude such that the leading edge of the rear element can come substantially into the vertical plane of the trailing edge of the front element, means for controlling the means for imparting a fore-and-aft relative displacement to said two wing elements, and a retractable landing gear operative by said means for imparting a fore-and-aft relative displacement to said two wing elements, whereby operation of said wing elements produces the operation of said retractable landing gear.

8. An aircraft which comprises, in combination, a body, at least one supporting surface, associated with said body, having a slotted portion constituted by a front element and a rear element each of a chord length equal to at least 60 per cent of the total chord length of said portion of the supporting surface, and means for imparting to said two elements both a fore-and-aft relative displacement including a forward displacement of the front element with respect to said body and a variation of incidence of the rear element, this fore-and-aft relative displacement being of an amplitude such that the leading edge of the rear element can come substantially into the vertical plane of the trailing edge of the front element.

9. An aircraft which comprises, in combination, at least one supporting surface having a slotted portion constituted by a front element and a rear element each of a chord length equal to at least 60 per cent of the total chord of said portion of the supporting surface, means for imparting a fore-and-aft relative displacement to said two elements, this displacement being of an amplitude such that the leading edge of the rear element can come substantially into the vertical plane of the trailing edge of the front element, and a secondary flap associated with at least one of said two elements for modifying the aerodynamic characteristics thereof.

10. An aircraft which comprises, in combination, at least one supporting surface having a slotted portion constituted by a front element and a rear element each of a chord length equal to at least 60 per cent of the total chord of said portion of the supporting surface, means for imparting a fore-and-aft relative displacement to said two elements, this displacement being of an amplitude such that the leading edge of the rear element can come substantially into the vertical plane of the trailing edge of the front element, and a secondary flap of the slotted curvature flap type associated with the rear wing element, the chord of said flap being at most equal to 30 per cent of the total chord of the whole supporting surface, said flap being so arranged that its downward pivoting does not substantially increase said total chord but materially modifies its curvature.

11. An aircraft which comprises, in combination, at least one supporting surface having a slotted portion constituted by a front element and a rear element each of a chord length equal to at least 60 per cent of the total chord of said portion of the supporting surface, means for imparting a fore-and-aft relative displacement to said two elements, this displacement being of an amplitude such that the leading edge of the rear element can come substantially into the vertical plane of the trailing edge of the front element, a secondary flap associated with at least one of said two elements for modifying the aerodynamic characteristics thereof, and control means for simultaneously operating said means for imparting a fore-and-aft relative displacement to said elements and said flap.

12. An aircraft which comprises, in combination, at least one supporting surface having a slotted portion constituted by a front element and a rear element each of a chord length equal to at least 60 per cent of the total chord of said portion of the supporting surface, a body associated with said supporting surface, means for imparting a fore-and-aft relative displacement to said two elements, including a forward displacement of the front element with respect to said body, this displacement being of an amplitude such that the leading edge of the rear element can come substantially into the vertical plane of the trailing edge of the front element, and a secondary flap associated with at least one of said two elements for modifying the aerodynamic characteristics thereof.

13. An aircraft which comprises, in combination, a body, at least one supporting surface, associated with said body, having a slotted portion constituted by a front element and a rear element each of a chord length equal to at least 60 per cent of the total chord length of said portion of the supporting surface, means for imparting such a fore-and-aft relative displacement to said two elements as to produce no variation of the position of the center of thrust of the whole of said supporting surface with respect to said body, said relative displacement including a forward displacement of the front element with respect to said body, this displacement being of an amplitude such that the leading edge of the rear element can come substantially into the vertical plane of the trailing edge of the front element, and a secondary flap associated with at least one of said two elements for modifying the aerodynamic characteristics thereof.

14. An aircraft which comprises, in combination, a body, at least one supporting surface associated with said body, having a slotted portion constituted by a front element and a rear element each of a chord length equal to at least 60 per cent of the total chord length of said portion of the supporting surface, means for imparting a fore-and-aft relative displacement to said two elements, including a forward displacement of the front element with respect to said body, this displacement being of an amplitude such that the leading edge of the rear element can come substantially into the vertical plane of the trailing edge of the front element, a secondary flap associated with at least one of said two elements for modifying the aerodynamic characteristics thereof, and control means for simultaneously operating said means for imparting a fore-and-aft relative displacement to said elements and said flap.

15. An aircraft which comprises, in combination, at least one supporting surface having a slotted portion constituted by a front element and a rear element each of a chord length equal to at least 60 per cent of the total chord of said portion of the supporting surface, means for imparting a fore-and-aft relative displacement to said two elements, this displacement being of an amplitude such that the leading edge of the rear element can come substantially into the vertical plane of the trailing edge of the front element, and a secondary flap associated with the rear element at the leading edge thereof for modifying the aerodynamic characteristics thereof.

ANDRE SCHWEISCH.